(12) United States Patent
Ma et al.

(10) Patent No.: US 12,245,212 B2
(45) Date of Patent: Mar. 4, 2025

(54) BANDWIDTH PART SWITCHING

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Jun Ma, San Diego, CA (US); Peter Pui Lok Ang, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/304,955

(22) Filed: Jun. 29, 2021

(65) Prior Publication Data
US 2022/0007346 A1     Jan. 6, 2022

Related U.S. Application Data

(60) Provisional application No. 63/047,515, filed on Jul. 2, 2020.

(51) Int. Cl.
*H04W 72/044*     (2023.01)
(52) U.S. Cl.
CPC ................ *H04W 72/046* (2013.01)
(58) Field of Classification Search
None
See application file for complete search history.

(56) References Cited

U.S. PATENT DOCUMENTS 10,863,571 B2 * 12/2020 Cirik .................. H04W 76/19
2019/0166066 A1     5/2019 Ang et al.
(Continued)

FOREIGN PATENT DOCUMENTS

WO    WO-2019040579 A1 *  2/2019  .............. F16L 11/18
WO    WO-2019070579 A1 *  4/2019  .............. H04L 5/001
(Continued)

OTHER PUBLICATIONS

Panasonic: "Discussion on Beam Management and Polarization for NTN", 3GPP TSG RAN WG1 #99, R1-1912902, Reno, USA, Nov. 18-22, 2019, Nov. 8, 2019 (Nov. 8, 2019) the Whole Document, 3 Pages, XP051820237, Retrieved from the Internet: URL: https://ftp.3gpp.org/tsg_ran/WG1_RL1/TSGR1_99/Docs/R1-1912902.zip. R1-1912902 Ntn Bm and Polarization.docx [Retrieved on Nov. 8, 2019] section 2.

(Continued)

*Primary Examiner* — Jeffrey M Rutkowski
*Assistant Examiner* — Luna Weissberger
(74) *Attorney, Agent, or Firm* — Harrity & Harrity, LLP

(57) ABSTRACT

Various aspects of the present disclosure generally relate to wireless communication. In some aspects, a user equipment may receive a bandwidth part configuration that indicates one or more bandwidth parts associated with at least one beam and switch, based at least in part on the bandwidth part configuration, from a first bandwidth part of the one or more bandwidth parts as an active bandwidth part to a second bandwidth part of the one or more bandwidth parts as the active bandwidth part. Numerous other aspects are provided.

69 Claims, 10 Drawing Sheets

(56) References Cited

U.S. PATENT DOCUMENTS

| | | | |
|---|---|---|---|
| 2019/0313357 A1 | 10/2019 | Wang et al. | |
| 2019/0313411 A1 | 10/2019 | Ly et al. | |
| 2020/0052782 A1 | 2/2020 | Wang et al. | |
| 2020/0374890 A1* | 11/2020 | Wu | H04J 11/0023 |
| 2022/0167338 A1* | 5/2022 | Cao | H04W 72/20 |
| 2022/0338230 A1* | 10/2022 | Yu | H04L 5/0053 |
| 2023/0188308 A1* | 6/2023 | Karjalainen | H04B 7/0408 370/336 |
| 2023/0224725 A1 | 7/2023 | Ma et al. | |
| 2023/0232384 A1 | 7/2023 | Ma et al. | |

FOREIGN PATENT DOCUMENTS

| | | | | |
|---|---|---|---|---|
| WO | WO-2019094781 A2 * | 5/2019 | | H04B 7/02 |
| WO | WO-2019095656 A1 * | 5/2019 | | H04W 28/20 |
| WO | 2019195528 A1 | 10/2019 | | |
| WO | WO-2021161065 A1 * | 8/2021 | | H04W 24/10 |
| WO | WO-2021163877 A1 * | 8/2021 | | |
| WO | WO-2021255491 A1 * | 12/2021 | | |

OTHER PUBLICATIONS

Partial International Search Report—PCT/US2021/070802—ISA/EPO—Oct, 14, 2021.
Co-pending U.S. Appl. No. 17/304,528, inventor Ma; Liangping, filed on Jun. 22, 2021.
Co-pending U.S. Appl. No. 17/324,982, inventor Shrestha; Bharat, filed on May 19, 2021.
Co-pending U.S. Appl. No. 17/359,291, inventor Ma; Liangping, filed on Jun. 25, 2021.
Co-pending U.S. Appl. No. 17/359,377, inventor Ma; Liangping, filed on Jun. 25, 2021.
International Search Report and Written Opinion—PCT/US2021/070802—ISA/EPO—Dec. 7, 2021.

* cited by examiner

BANDWIDTH PART SWITCHING

CROSS-REFERENCE TO RELATED APPLICATION

This Patent Application claims priority to U.S. Provisional Patent Application No. 63/047,515, filed on Jul. 2, 2020, entitled "BANDWIDTH PART SWITCHING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for bandwidth part switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors coupled to the memory, the one or more processors configured to: receive a bandwidth part (BWP) configuration that indicates one or more BWPs associated with at least one beam; and switch, based at least in part on the BWP configuration, from a first BWP of the one or more BWPs as an active BWP to a second BWP of the one or snore BWPs as the active BWP.

In some aspects, a wireless communication device for wireless communication includes a memory, and one or more processors coupled to the memory, the one or more processors configured to: transmit, to a UE, a BWP configuration that indicates one or more BWPs associated with at least one beam; and switch, based at least in part on the BWP configuration, from a first BWP of the one or more BWPs as an active BWP to a second BWP of the one or more BWPs as the active BWP.

In some aspects, a method of wireless communication performed by a UE includes receiving a BWP configuration that indicates one or more BWPs associated with at least one beam; and switching, based at least in part on the BWP configuration, from a first BWP of the one or more BWPs as an active BWP to a second BWP of the one or more BWPs as the active BWP.

In some aspects, a method of wireless communication performed by a wireless communication device includes transmitting, to a UE, a BWP configuration that indicates one or more BWPs associated with at least one beam; and switching, based at least in part on the BAT configuration, from a first BWP of the one or more BWPs as an active BWP to a second BWP of the one or more BWPs as the active BWP.

In some aspects, a non-transitory computer-readable medium storing one or more instructions for wireless communication includes one or more instructions that, when executed by one or more processors of a UE, cause the one or more processors to: receive a BWP configuration that indicates one or more BWPs associated with at least one beam; and switch, based at least in part on the BWP configuration, from a first BWP of the one or more BWPs as an active BWP to a second BWP of the one or more BWPs as the active BWP.

In some aspects, a not transitory computer-readable medium storing one or more instructions for wireless communication includes one or more instructions that, when executed by one or more processors of a wireless communication device, cause the one or more processors to: transmit, to a UE, a BWP configuration that indicates one or more BWPs associated with at least one beam; and switch, based at least in part on the MVP configuration, from a first BWP of the one or more BWPs as an active BWP to a second BWP of the one or more BWPs as the active BWP.

In some aspects, an apparatus for wireless communication includes means for receiving a BWP configuration that indicates one or more BWPs associated with at least one beam; and means for switching, based at least in part on the BWP configuration, from a first BWP of the one or more BWPs as an active BWP to a second BWP of the one or more BWPs as the active BWP.

In some aspects, an apparatus for wireless communication includes means for transmitting, to a user equipment, a BWP configuration that indicates one or more BWPs associated with at least one beam; and means for switching, based at least in part on the BWP configuration, from a first BWP of the one or more BWPs as an active BWP to a second BWP of the one or more BWPs as the active BWP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleaves, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
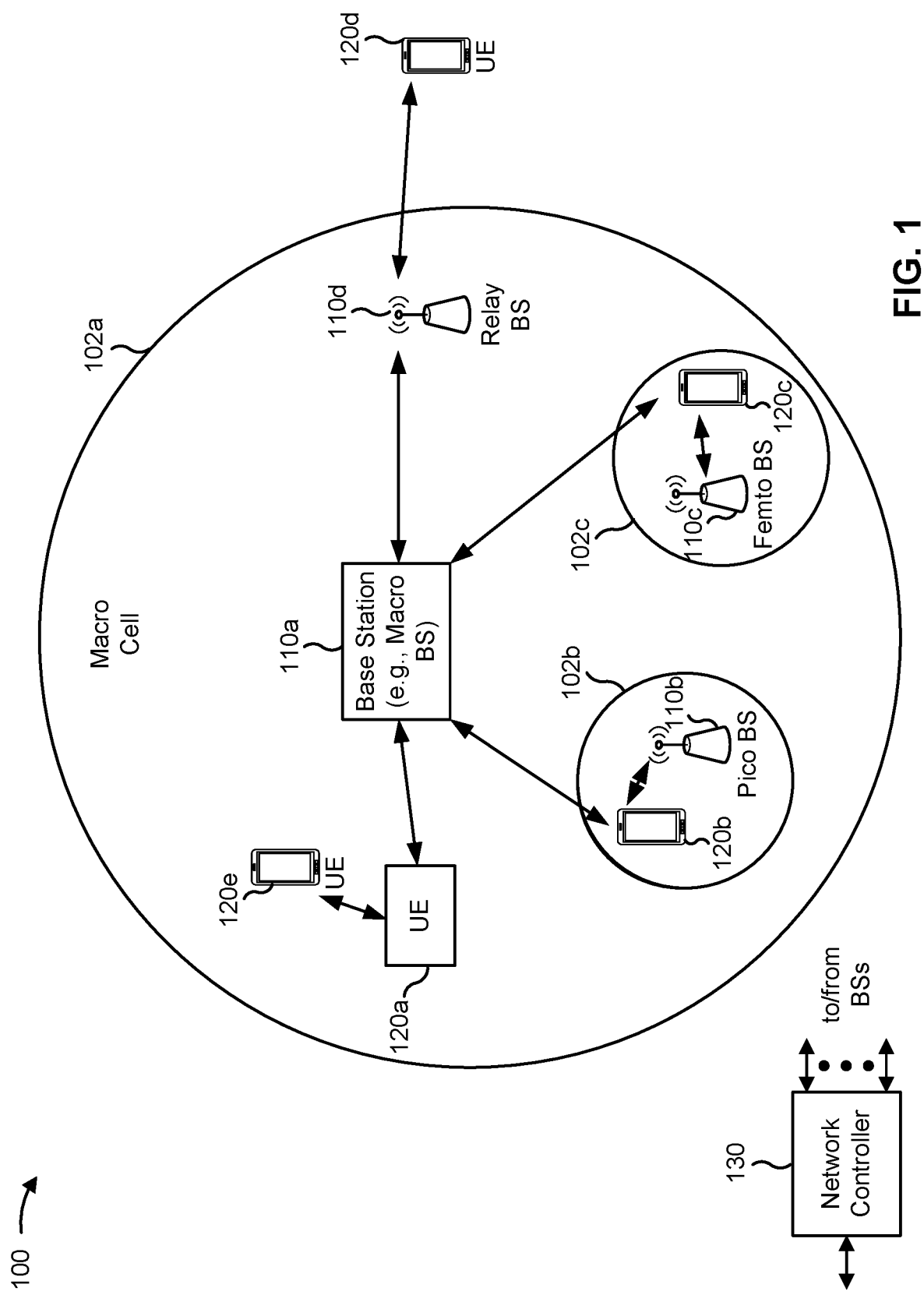
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. in the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial BS, a non-terrestrial relay station, and/or the like.

The wireless network 100 may include any number of non-terrestrial wireless communication devices. A non-terrestrial wireless communication device may include a satellite, an unmanned aircraft system (LAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, one or more components and/or devices included in a core network of wireless network 100, and/or the like.

The wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Sonic UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like, Each frequency may support a single RAT in a given geographic area in order to avoid interference between wireless networks of different RATs. In some cases, NR, or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies, Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FRI, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). it is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
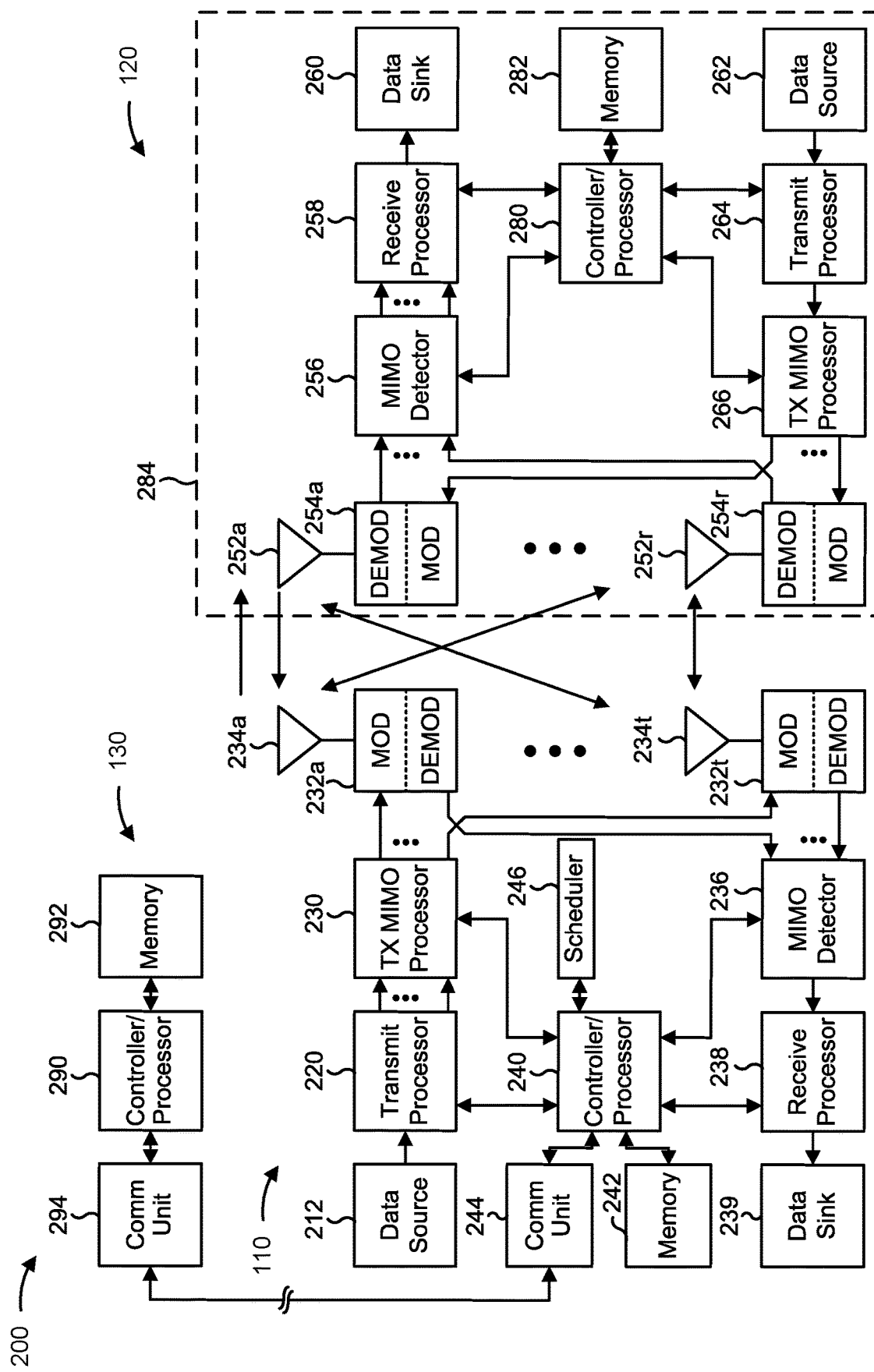
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of Melina elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOB 232) of the base station 110 may be included in a modem of the base station 110. In some aspects, the base station a 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10).

Controller/processor 240 of base station 110, controller/processor 280 of UE 120, and/or any other component(s) of FIG. 2 may perform one or more techniques associated with bandwidth part (BWP) switching, as described in snore detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for receiving a BWP configuration that indicates one or snore BWPs associated with at least one beam, means for switching, based at least in part on the BWP configuration, from a first BWP of the one or more BWPs as an active BWP to a second BWP of the one or more BWPs as the active BWP, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a user equipment, a BWP configuration that indicates one or more BWPs associated with at least one beam, means for switching, based at least in part on the BWP configuration, from a first BWP of the one or more BWPs as an active BWP to a second BWP of the one or more BWPs as the active BWP, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
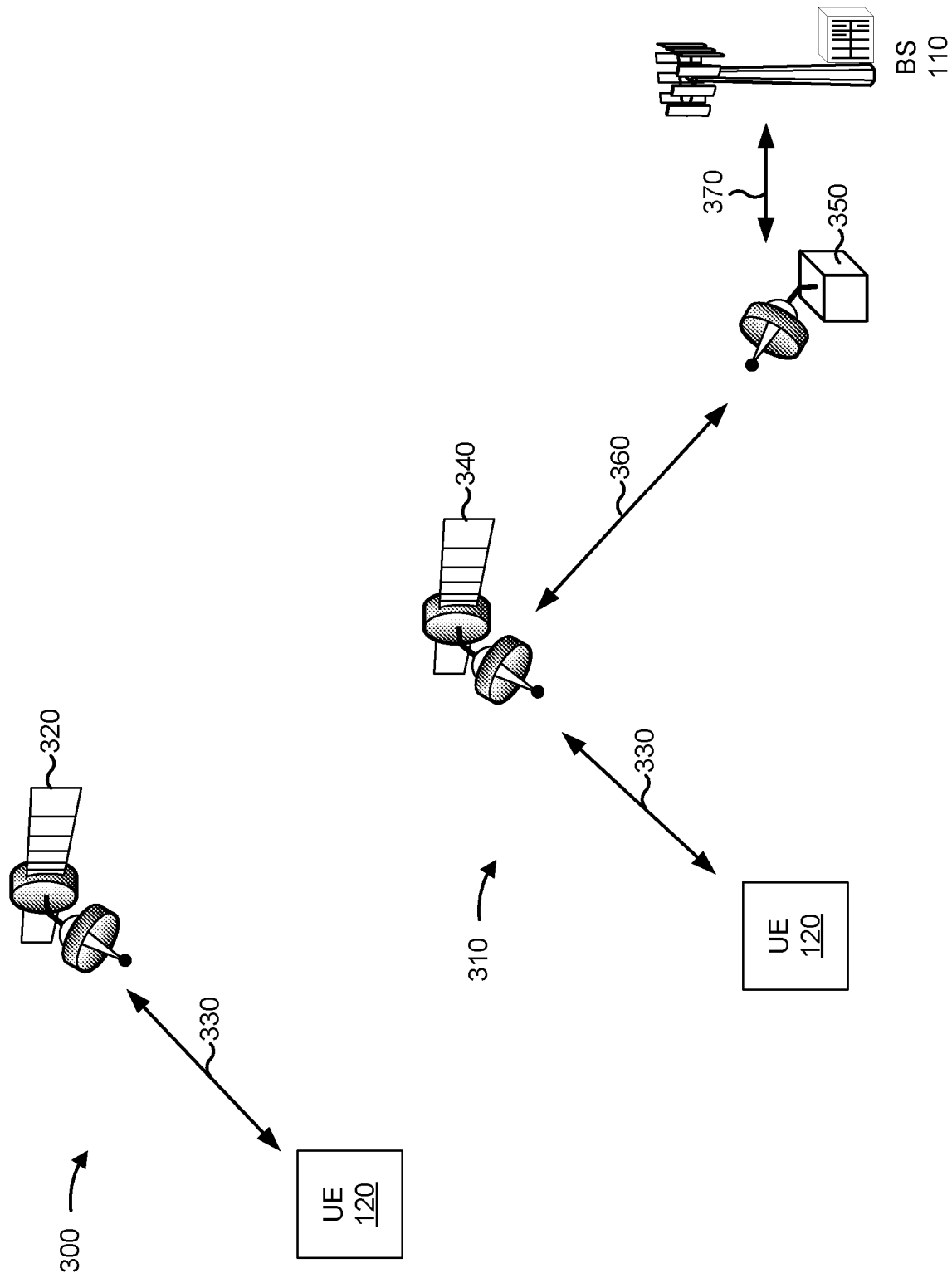
FIG. 3 is a diagram illustrating an example of a regenerative satellite deployment and an example of a transparent satellite deployment in a non-terrestrial network (NTN), in accordance with the present disclosure.

FIG. 3 is a diagram illustrating examples 300 and 310 of NTN deployments. The example 300 and/or the example 310 may be, be similar to, include, or be included in, a wireless network such as the wireless network 100 shown in, and described in connection with, FIG. 1.

Example 300 shows a conceptual depiction of a regenerative satellite deployment. In. example 300, a UE 120 is served by a satellite 320 via a service link 330 For example, the satellite 320 may include a BS 110 (e.g., BS 110*a*), a gNB, one or more functions (e.g., RF filtering, frequency conversion, amplification, demodulation, decoding, switching, routing, coding, modulation, and/or the like) of a BS 110, and/or the like. The service link 330 may include an NR-Uu interface that is terminated at the satellite 320. In sonic aspects, the satellite 320 may be referred to as a nor-terrestrial base station, a regenerative repeater, an on-board processing repeater, and/or the like. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be referred to as a transparent satellite, a bent-pipe satellite, a non-terrestrial relay station, and/or the like. The satellite 340 may relay a signal received from a terrestrial BS 110, via an NTN gateway 350. The satellite may repeat an NR-Uu interface via a feeder link 360. The NTN gateway 350 may communicatively connect the satellite 340 and the BS 110 using an RF link 370 For example, the satellite 340 may receive an uplink radio frequency transmission and may transmit a downlink radio frequency transmission without demodulating the uplink radio frequency transmission. In some aspects, the satellite 340 may frequency convert the uplink radio frequency transmission received on the service link 330 to a frequency of the downlink radio frequency transmission on the feeder link 360 and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide and/or facilitate a cell that covers the UE 120.

The service link 330 may include a link between the satellite 341, and the UE 120, and may include one or more of a UL or a DL. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects clue to the movement of the satellites 320 and 340, and potentially movement of a UE 120. These Doppler effects may be significantly larger than in a terrestrial network. The Doppler effect on the feeder link 360 may be compensated for to some degree but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
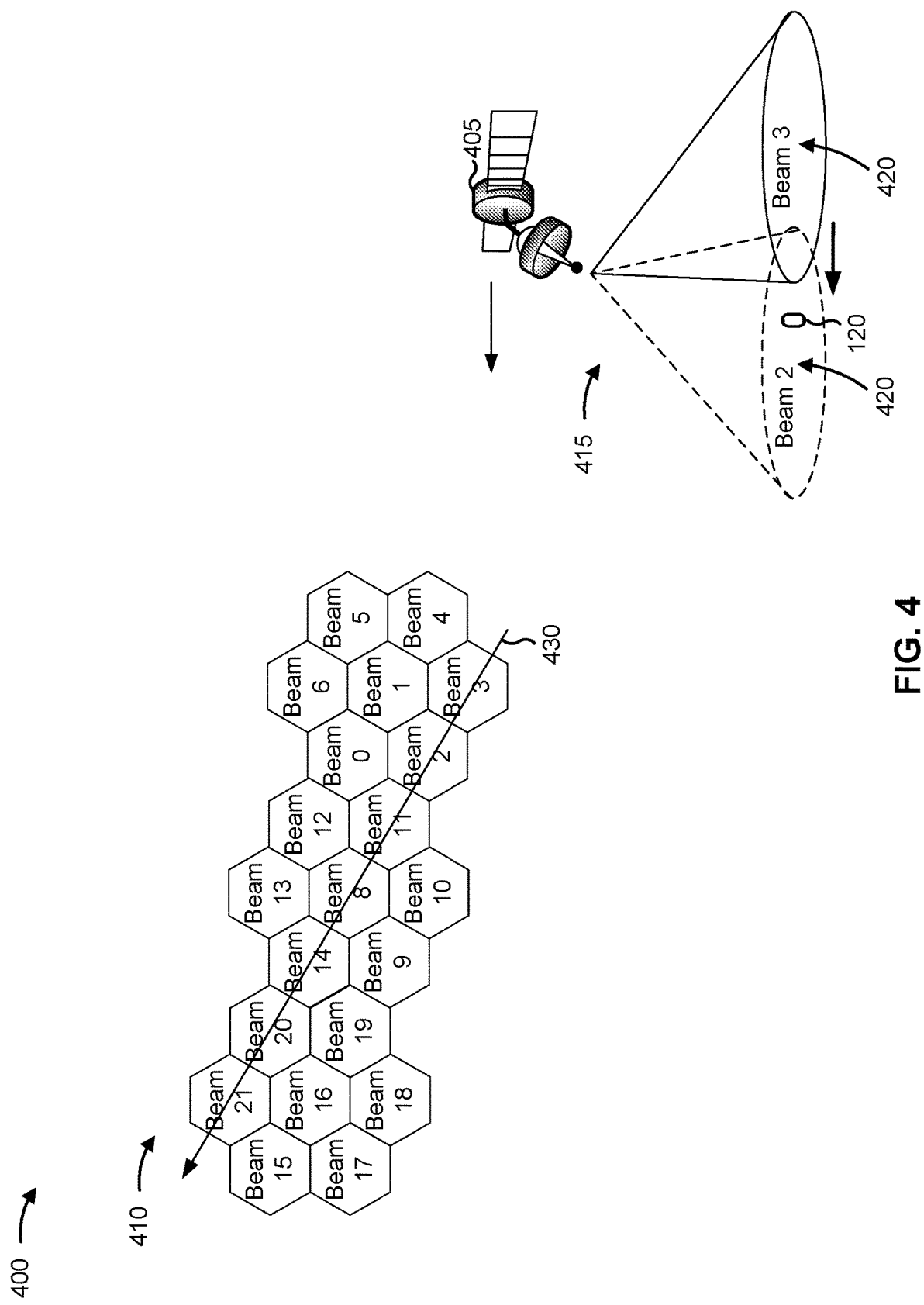
FIG. 4 is a diagram illustrating an example of beam management in an NTN, in accordance with the present disclosure.

FIG. 4 is a diagram illustrating an example 400 of beam management in an NTN, in accordance with the present disclosure. As shown, a satellite 405 may serve a UE 120. The satellite 405 may be, include, be included in, or be similar to, the satellite 320 shown in FIG. 3, the satellite 340 shown in FIG. 3, and/or the like.

As shown by reference number 410, the satellite 405 may use multiple antennas to form multiple beams (shown as "beam 0," "beam 1," . . . , "beam 21") that form a beam footprint on the earth. One or more different frequency intervals may be associated with each beam to mitigate interference between beams, thereby facilitating simultaneous transmission and reception capabilities. In some cases, one or more different beams may be associated with a frequency interval. The frequency intervals may be, or include, BWPs. Within each beam, multiple BWPs may be defined to accommodate different UE capabilities, quality of service (QoS) requirements, and/or the like. Orthogonal frequency division multiplexing (OFDM) subcarriers within the BWPs typically are orthogonal relative to one another.

As the satellite 405 moves, the beam footprint moves across the ground. Thus, as shown by reference number 415, as the satellite 405 moves, different beams may interact with the UE 120. For example, as shown, a UE 120 may be located within a footprint associated with a first beam (shown as "beam 2") at a first time instance and, as the satellite 405 moves, the UE 120 may be located within a footprint associated with a second beam (shown as "beam 3"). A satellite may move as fast as, for example, 7 kilometers/second, or faster. As a result, the UE 120 may switch beams frequently. To mitigate resulting Doppler frequency shift as the satellite 405 moves, the satellite 405 may perform a frequency pre-compensation. The frequency pre-compensation may target a center 420 of a beam footprint.

In a typical scenario, the network may configure all of the beams from the satellite 405 as a cell with an initial BWP pair (uplink and downlink) associated with each beam. The satellite 405 may signal to the UE 120 which BWP to switch to as the beam footprints move relative to the UE 120. However, terrestrial NR supports at most four configured BWPs for each UE 120. As a result, the currently supported configurations may not be sufficient to support the rapid beam switching associated with NTN deployments. As shown by reference number 410, as the satellite moves in the direction of the arrow 430, the number of BWPs that a UE 120 may switch to may be greater than 4 (e.g., 7 in the illustrated example). Accordingly, connection with the satellite 405 may be lost and/or, if BWP reconfiguration is implemented, latency may be introduced.

According to various aspects of the techniques and apparatuses described herein, a wireless communication device (which may include a non-terrestrial base station, such as a satellite, a terrestrial base station, and/or the like) may configure multiple BWPs associated with beams for a particular UE and may indicate to the UE the type of switching that each BWP corresponds to. For example, the indication may indicate whether a switch from a first BWP to a second BWP is an intra-beam switch or an inter-beam switch. In this way, aspects may facilitate efficient BWP switching and robust configurations. As a result, aspects may enable more reliable communications, with decreased latency and increased throughput.

As indicated above, FIG. 4 is provided as an example. Other examples may differ from what is described with regard to FIG. 4.

Figure 5:
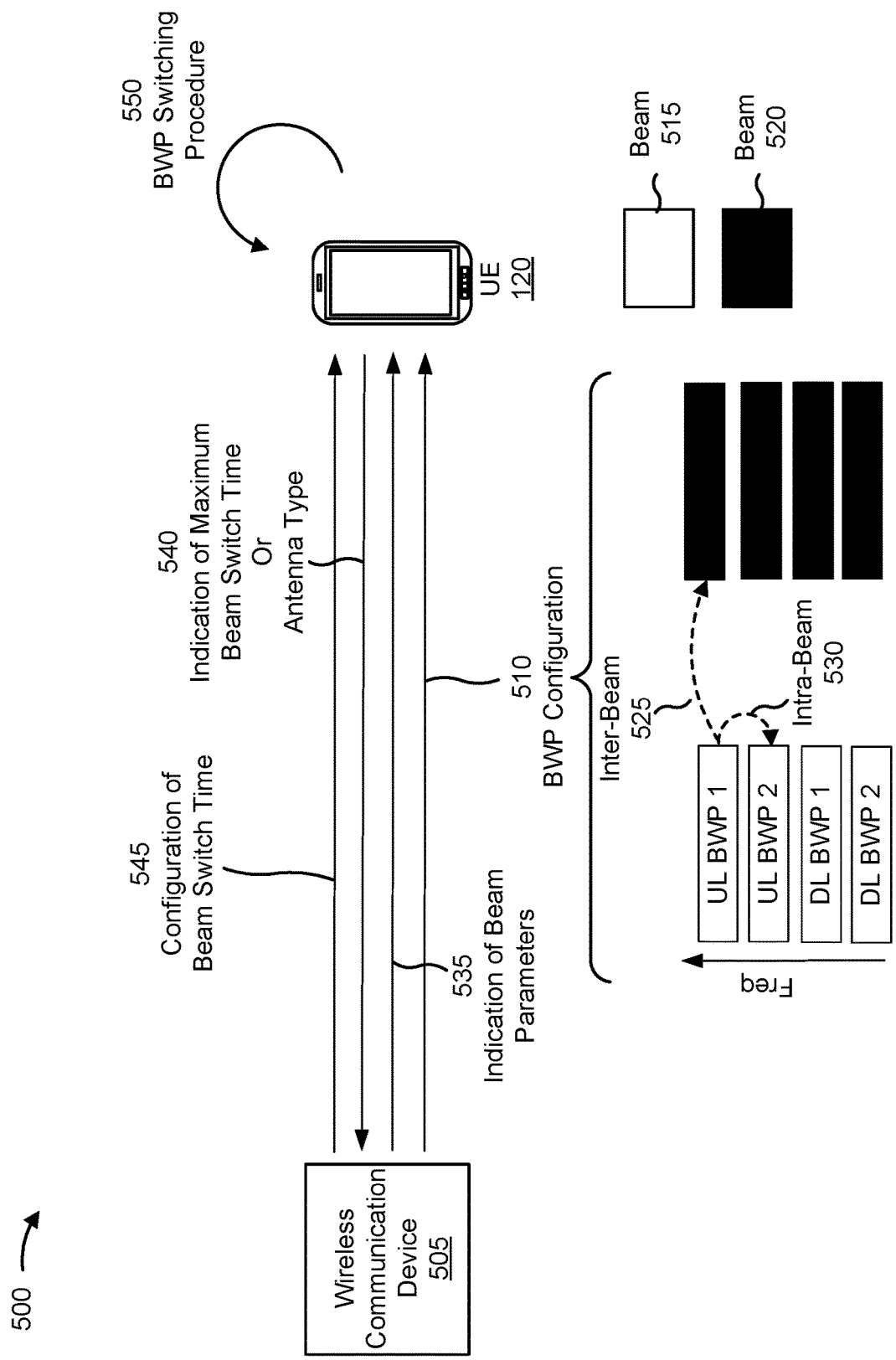
FIGS. 5-8 are diagrams illustrating examples associated with bandwidth part (BWP) switching, in accordance with the present disclosure.

FIG. 5 is a diagram illustrating an example 500 associated with BWP switching, in accordance with the present disclosure. As shown, a wireless communication device 505 and a UE 120 may communicate with one another. The wireless communication device 505 may include a base station (e.g., BS 110 shown in, and described in connection with, FIG. 1, and/or the like), a non-terrestrial base station (e.g., the satellite 320 shown in, and described in connection with, FIG. 3; the satellite 405 shown in, and described in connection with, FIG. 4, and/or the like), a non-terrestrial relay station (e.g., the satellite 340 shown in, and described in connection with, FIG. 3; the satellite 405 shown in, and described in connection with, FIG. 4; and/or the like), and/or the like.

As shown by reference number 510, the wireless communication device 505 may transmit, and the UE 120 may receive, a BWP configuration. In some aspects, the BWP configuration may be carried in a radio resource control (RRC) message, downlink control information (DCI), a medium access control (MAC) control element (MAC-CE), a system information block (SIB), and/or the like. The BWP configuration may indicate one or more BWPs associated with at least one beam. For example, as shown, the BWP configuration may indicate a number of BWPs (shown as UL BWP 1, UL BWP 2, DL BWP 1, and DL BWP 2)

corresponding to a first beam 515, a number of BWPs (shown as UL BWP 3, UL BWP 4, DL BWP 3, and DL BWP 4) corresponding to a second beam 520, and/or the like.

In some aspects, a BWP of the one or more BWPs may be associated with a beam of the serving wireless communication device 505 or a beam of an additional wireless communication device 505. In some aspects, as shown, the BWP configuration inlay indicate a first initial uplink (UL) BWP (UL BWP 1) associated with a first beam 515, a first initial downlink (DL) BWP (DL BWP 1) associated with the first beam 515, a second initial UL BWP (UL BWP 3) associated with a second beam 520, a second initial DL BWP (DL BWP 3) associated with the second beam 520, and/or the like.

In some aspects the BWP configuration may indicate a first default UL BWP (UL BWP 2) associated with the first beam 515, a first default DL BWP (DL BWP 2) associated with the first beam 515, a second default UL BWP (UL BWP 4) associated with the second beam 520, a second default DL BWP (DL BWP 4) associated with the second beam 520, and/or the like. In some aspects, the BWP configuration may not include a configuration of at least one default BWP associated with the at least one beam. In some such instances, at least one configured initial BWP associated with the at least one beam may be the at least one default BWP.

In some aspects, the BWP configuration indicates a maximum number of BWPs. In some aspects, the maximum number of MVPs may be greater than four (e.g., five, six, seven, eight, and/or the like). In some aspects, the maximum number of BWPs may include a maximum number of intra-beam BWPs, a maximum number of inter-beam BWPs, and/or the like.

In some aspects, as shown by reference number 525, the BWP configuration may indicate an inter-beam BWP switching procedure. The BWP configuration may indicate a first BWP (e.g., UL BWP 1), an association between the first BWP and the first beam 515, a second BWP (e.g., UL BWP 3), an association between the second BWP (UL BWP 3) and the second beam 520, and/or the like.

In some aspects, air inter-beam BWP switching procedure may be configured using an RRC message, an SIB, and/or the like. In some aspects, BWP configuration may be carried in an RRC message that indicates the second BWP (UL BWP 3) as a target BWP for switching. in some aspects, the second BWP may include an active UL BWP or an active DL BWP. In some aspects, the RRC message may include a setup message (e.g., an RRCSetup message), a reconfiguration message (e.g., an RRCReconfiguration message), and/or the like.

As shown by reference number 530, the BWP configuration may indicate an intra-beam BWP switching procedure, a first BWP (UL BWP 1), an association between the first BWP (UL BWP 1) and the first beam 515, a second BWP (UL BWP 2), an association between the second BWP (UL BWP 2) and the first beam 515, and/or the like. In some aspects, the intra-beam BWP switching procedure may be configured using an RRC message.

As shown by reference number 535, the wireless communication device 505 may transmit, and the UE 120 may receive, an indication of one or more beam parameters associated with at least one beam. In some aspects, the wireless communication device 505 may broadcast the indication. In some aspects, the one or more beam parameters may indicate a Doppler frequency pre-compensation value associated with the at least one beam, a target location within a beam footprint associated with the at least one beam, a timing adjustment parameter associated with the at least one beam, and/or the like. In some aspects, the target location may include a center location of the beam footprint. In some aspects, the tinting adjustment parameter may include an offset parameter corresponding to a delay component between the wireless communication device 505 and the user equipment 120 within the beam footprint.

As shown by reference number 540, the UE 120 may transmit, and the wireless communication device 505 may receive, an indication of a maximum beam switch time associated with the UE 120 or an indication of an antenna type associated with the UE 120. The maximum beam switch time may indicate a maximum amount of time that the UE 120 takes to switch from one beam to another. The wireless communication device 505 may determine a beam switch time based at least in part on the maximum beam switch time or the antenna type. In some aspects, the antenna type may include a motor steered antenna type, an active electronically scanned array type, and/or the like.

As shown by reference number 545, the wireless communication device 505 may transmit, and the UE 120 may receive, a beam switch time configuration. The beam switch time configuration may indicate a beam switch time associated with a switch, by the UE 120, from a first beam to a second beam as an active beam. In some aspects, the wireless communication device 505 may transmit, and the UE 120 may receive, a pre-compensation switch time configuration. In some aspects, the pre-compensation switch time configuration may indicate a pre-compensation switch time associated with a switch, by the UE 120, from a first frequency pre-compensation to a second frequency pre-compensation as an active pre-compensation.

As shown by reference number 550, the UE 120 may perform a BWP switching procedure to switch, based at least in part on the BWP configuration, from a first BWP to a second BWP as the active BWP. In some aspects, the BWP switching procedure may include an inter-beam BWP switching procedure, in which the first BWP and the second BWP are associated with different beams. In some aspects, the BWP switching procedure may include an intra-beam BWP switching procedure, in which the first BWP and the second BWP are associated with the same beam. In some aspects, the UE 120 may switch from the first BWP as an active BWP to the second BWP as the active BWP, and from a serving beam to a target beam associated with the second BWP, within a configured switch time delay. In some aspects, the BWP switch may occur within the configured switch time delay based at least in part on the target beam being different than the serving beam.

As indicated above, FIG. 5 is provided as an example. Other examples inlay differ from what is described with regard to FIG. 5.

Figure 6:
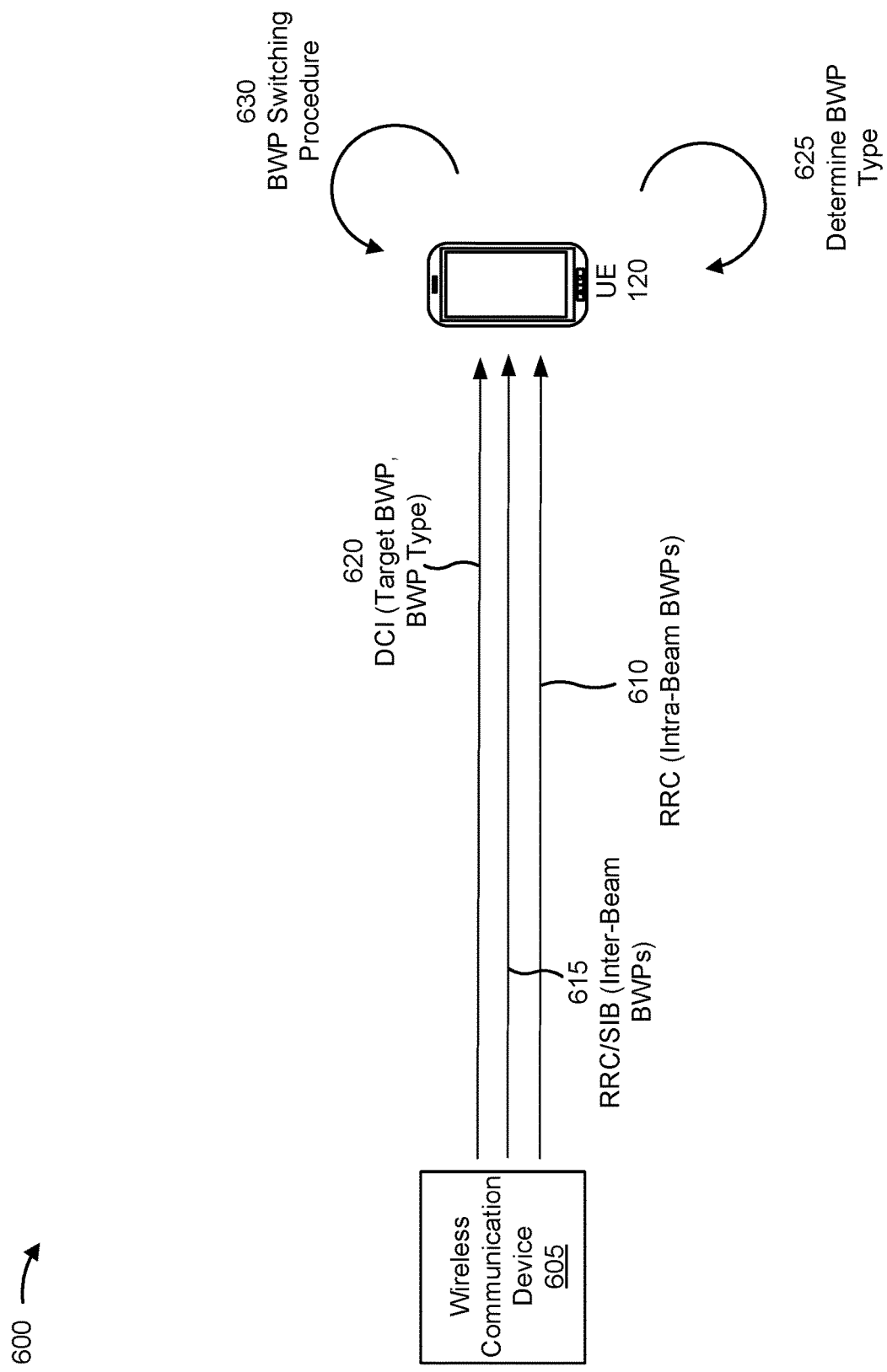

FIG. 6 is a diagram illustrating an example 600 associated with BWP switching, in accordance with the present disclosure. As shown, a wireless communication device 605 and a UE 120 may communicate with one another. The wireless communication device 605 may be, or be similar to the wireless communication device 505 shown in, and described in connection with, FIG. 5.

As shown by reference number 610, the wireless communication device 605 may transmit, and the UE 120 may receive, an RRC message (or messages) including a BWP configuration. The BWP configuration may indicate intra-beam BWPs. In some aspects, the intra-beam BWPs may be BWPs that are associated with a current serving beam (e.g., a beam that is used to carry the RRC message). As shown by reference number 615, the wireless communication device 605 may transmit, and the UE 120 may receive, a configuration of inter-beam BWPs. Inter-beam BWPs may include BWPs associated with beams other than the serving beam. In some aspects, intra beam MVPs and inter-beam. BWPs may be indexed separately. The inter-beam BWPs may be carried using an RRC message, an SIB, and/or the like.

In some aspects, inter-beam BWPs may include initial BWPs associated with other beams, default BWPs associated with other beams, and/or the like. For example, in some aspects, an inter-beam BWP may include an initial BWP of a target beam and, after the UE 120 switches to the initial BWP and the corresponding target beam, the wireless communication device 605 array transmit an additional BAT configuration that indicates intra-beam BWPs associated with the target beam (which, at that point, would have become the new serving beam).

As shown by reference number 620, the wireless communication device 605 may transmit, and the UE 120 may receive, a BWP configuration that indicates a target BWP and a BWP type associated with the target BWP. In sonic aspects, this BWP configuration may be referred to as a BWP switching trigger, a BWP switch message, and/or the like. In some aspects, the BWP configuration shown by reference number 620 may be carried in DCI. In some aspects, a BWP type indicator may be carried in an encoded communication that includes the DCI. The UE 120 may directly decode a physical downlink control channel (PDCCH) payload containing the encoded communication to extract the BWP type indicator.

The DCI may include a first set of indices associated with intra-beam BWPs and a second set of indices associated with inter-beam BWPs. In some aspects, the BWP configuration may be carried in DCI having a BWP identification (ID) field having a maximum number of bits that is greater than two. In this way, the BWP ID field may be able to accommodate more than four configured BWPs to enable greater flexibility in BWP configuration, As shown by reference number 625, the UE 120 may determine the BWP type of the target BWP and, as shown by reference number 630, the UE 120 may switch to the target BWP. In sonic examples, the UE 120 may determine the BWP type using a procedure that is based at least in part on how the BWP type is indicated using the DCI. In some aspects the DCI may indicate the BWP type using a BWP type field having at least one bit, and the UE 120 may directly decode a PDCCH payload containing the DCI to extract the at least one bit. For example, the DCI may include a DCI Format 0_1 or DCI Format 1_1, and a bit may be added to indicate the BWP type (e.g., wherein "0" may indicate an intra-beam BWP and "1" may indicate an inter-beam BWP, or vice-versa), In some aspects, the DCI may indicate the BWP type using a scrambling sequence applied to a rate-matched channel encoder output. A first scrambling sequence may indicate a first BWP type and a second scrambling sequence may indicate a second BWP type. In some aspects, the UE 120 may blindly decode a PDCCH payload containing the DCI using the first scrambling sequence and the second scrambling sequence to determine the BWP type.

In some aspects, the DCI may indicate the BWP type using a radio network temporary identifier (RNTI), In some aspects, a first RNTI of a first sub-type may indicate a first BWP type and a second RNTI of a second sub-type may indicate a second BWP type. The RNTI may include a cell RNTI (C-RNTI), a configured scheduling RNTI (CS-RNTI), a modulation and coding scheme cell RNTI (MCS-C-RNTI), and/or the like. For example, in some aspects, a C-RNTI sub-type 0 may indicate an intra-bean BWP, a C-RNTI sub-type 1 may indicate an inter-beam BWP, and/or the like. In some aspects, the UE 120 may blindly decode a PDCCH payload containing the DCI using the first RNTI sub-type and the second RNTI sub-type to determine the BWP type.

In some aspects, the DCI may indicate the BWP type using a DMRS sequence. In some aspects, a first DMRS sequence may indicate a first BWP type and a second DMRS sequence may indicate a second BWP type. The UE 120 may determine the BWP type by checking both DMRS sequences and determining which DMRS sequence results in a correct cyclic redundancy check (CRC). A correct CRC may include a CRC that produces no errors or that produces a number of errors that satisfy a particular error threshold.

As indicated above, FIG. 6 is provided as an example. Other examples may differ from what is described with regard to FIG. 6.

Figure 7:
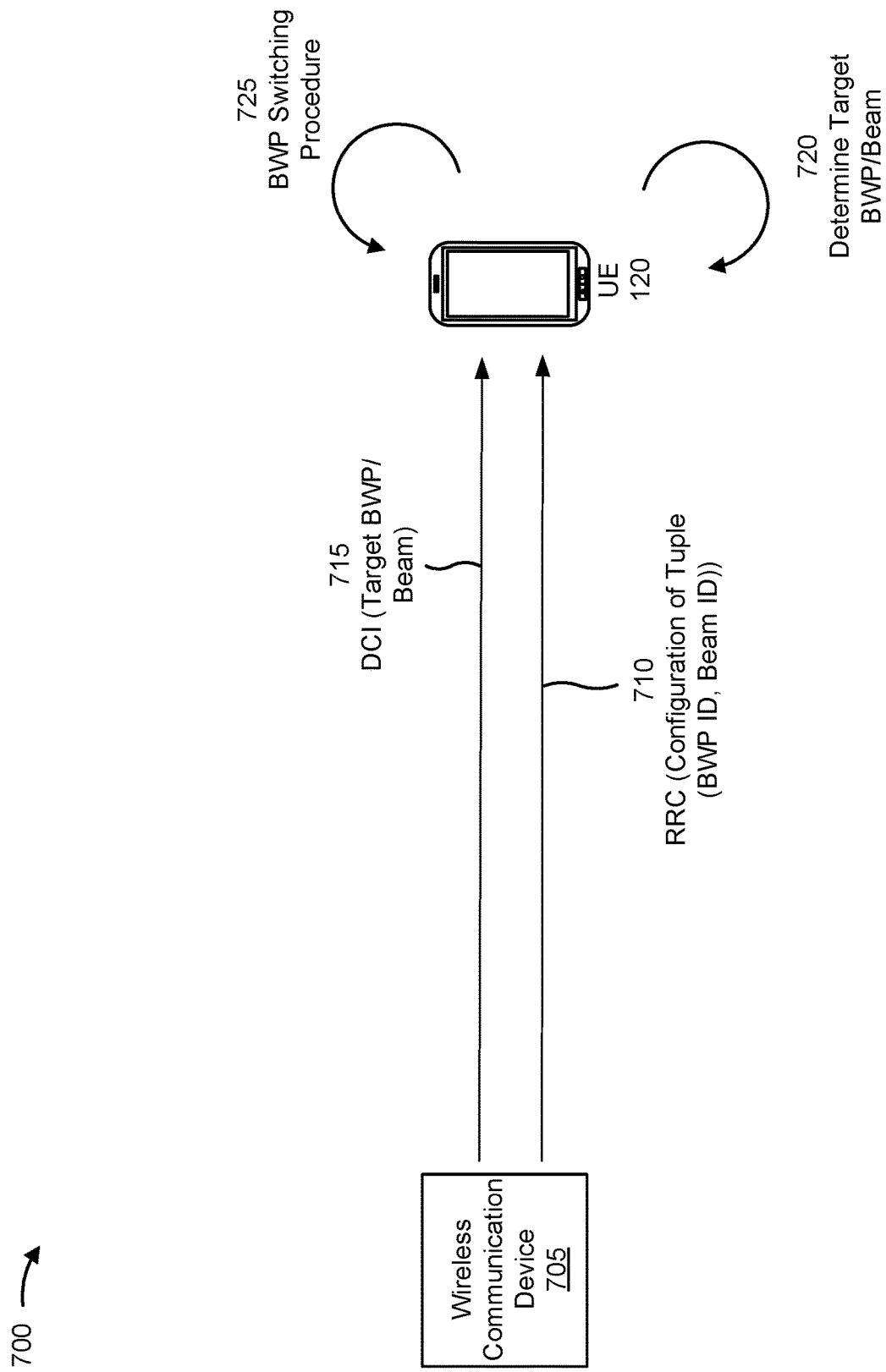

FIG. 7 is a diagram illustrating an example 700 associated with BWP switching, in accordance with the present disclosure. As shown, a wireless communication device 705 and a UE 120 may communicate with one another. The wireless communication device 705 may be, or be similar to, the wireless communication device 505 shown in, and described in connection with, FIG. 5; the wireless communication device 605 shown in, and described in connection with, FIG. 6; and/or the like.

As shown by reference number 710, the wireless communication device 705 may transmit, and the UE 120 may receive, an RRC message including a BWP configuration. In some aspects, the BWP configuration may configure a BWP ID field to include a tuple having a unique tuple ID. In some aspects, the tuple ID may indicate a BWP ID and a beam ID. In some aspects, the beam ID may include a cell ID, a synchronization signal block (SSB) index, a dedicated beam ID, and/or the like.

In some aspects, the beam ID may indicate a target beam. As shown by reference number 715, the wireless communication device 705 may transmit, and the UE 120 may receive, DCI that indicates a tuple that indicates a target BWP and a corresponding target beam. In some aspects, the DCI may include the tuple in a BWP ID field. In some aspects, a number of bits of the BWP ID field may be greater than two.

The wireless communication device 705 and/or the UE 120 may identify the target beam based at least in part on a determination that the UE 120 is likely to intercept (e.g., interact with, be co-located with, pass through, and/or the like) the beam. In some aspects, the wireless communication device 705 and/or the UE 120 inlay determine that the UE 120 is likely to intercept a particular beam based at least in part on a mobility state of the beam, a mobility state of the UE 120, and/or the like. For example, in some aspects, the wireless communication device 705 may determine that the UE 120 is likely to intercept a particular beam by determining that, based on a trajectory, speed, acceleration, and/or the like, of the beam (and/or the wireless communication device 705 generating the beam), a probability of the UE 120 and the beam interacting within a specified amount of time satisfies a specified probability threshold.

As shown by reference number 720, the UE 120 may determine the target BWP and target beam. The UE 120 may determine the target BWP and target beam based at least in part on the tuple ID. As shown by reference number 725, the UE 120 may perform a BWP switching procedure based at least in part on the target BWP and target beam. In some aspects, the UE 120 may reset a default BWP associated with the UE 120 to correspond to a default BWP associated with the target beam that is associated with the second BWP.

As indicated above. FIG. 7 is provided as an example. Other examples may differ from what is described with regard to FIG. 7.

Figure 8:
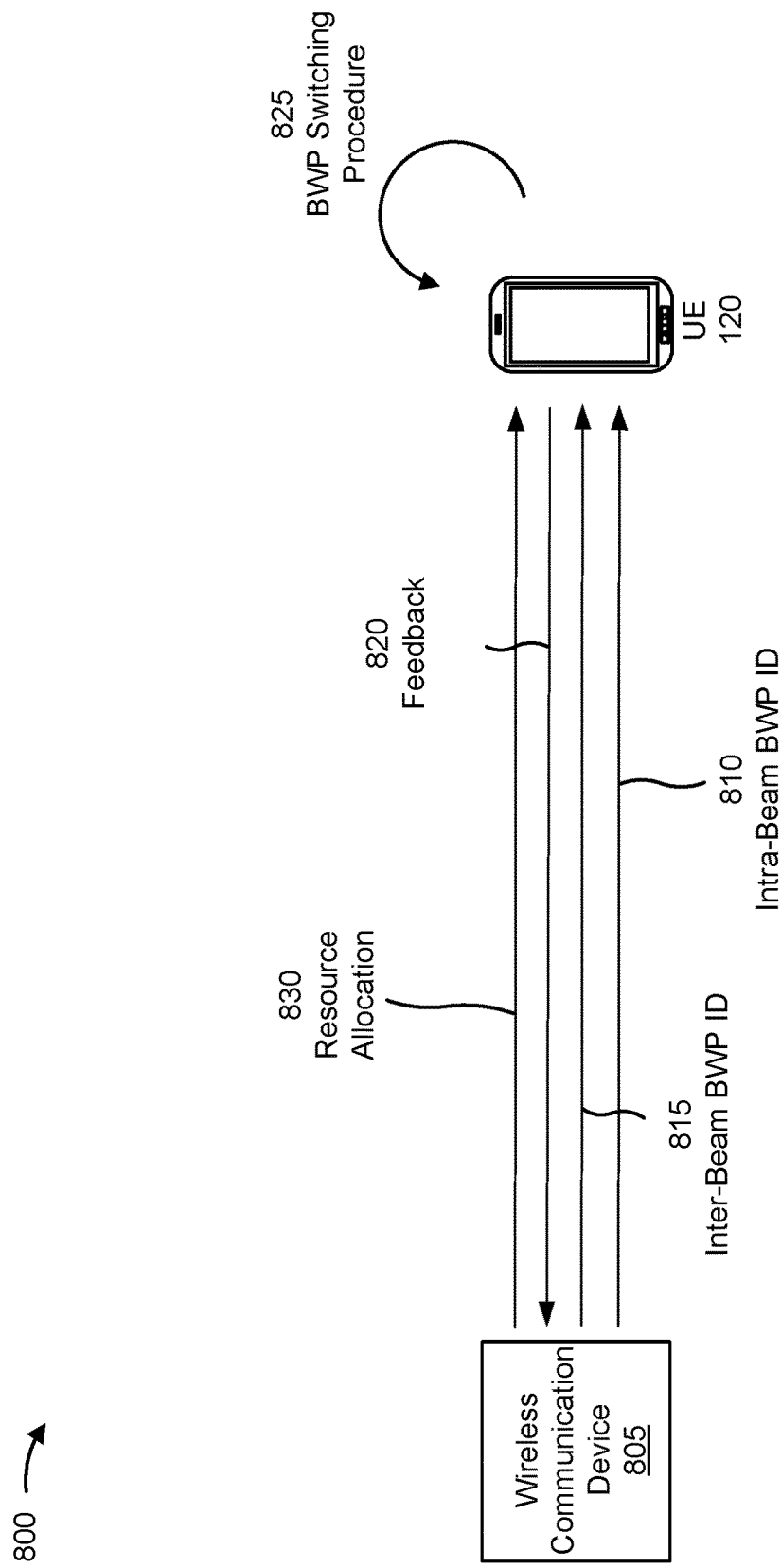

FIG. 8 is a diagram illustrating an example 800 associated with BWP switching, in accordance with the present disclosure. As shown, a wireless communication device 805 and a UE 120 may communicate with one another. The wireless communication device 805 may be, or be similar to, the wireless communication device 505 shown in, and described in connection with, FIG. 5; the wireless communication device 605 shown in, and described in connection with, FIG. 6; the wireless communication device 705 shown in, and described in connection with, FIG. 7; and/or the like.

As shown by reference number 810, the wireless communication device 805 may transmit, and the UE 120 may receive, an intra-beam BWP ID. As shown by reference number 815, the wireless communication device 805 may transmit, and the UE 120 may receive, an inter-beam BWP ID. In some aspects, the intra-beam BWP ID and the inter-beam BWP ID may be signaled separately in a way that reduces signaling overhead. For example, in some aspects, the intra-beam BWP ID may be carried in DCI and the inter-beam BWP ID may be carried in a MAC-CE. In some aspects, the intra-beam BWP ID may be carried in DCI, and the inter-beam BWP ID may be carried in an RRC message. In some aspects, the intra-beam BWP ID may be carried in a MAC-CE or an RRC message and the inter-beam BWP ID may be carried in DCI.

In some aspects, the inter-beam BWP ID may be carried in a dedicated DCI format. In some aspects, the dedicated DCI format may include a set of resource elements that indicate an inter-beam BWP ID, a wireless communication device ID, a beam ID, and/or the like. In some aspects, the inter-beam BWP ID may indicate an Initial UL BWP, an Initial DL BWP, a default UL BWP, a default DL BWP, and/or the like. In some aspects, the beam ID may include a cell ID, an SSB index, a dedicated beam ID, and/or the like.

In some aspects, the wireless communication device 805 may indicate the dedicated DCI format to the UE 120. In some aspects, the indication may include an RRC configured search space, a C-RNTI used to address the UE 120 and a format ID field in the DCI, an inter-beam BWP switching RNTI used to address the UE 120, a specified scrambling sequence applied to a rate-matched channel encoder output, a specified DMRS sequence, a dedicated DCI format ID that is encoded into an encoded message that includes the DCI, and/or the like.

As shown by reference number 820, the UE 120 may transmit, and the wireless communication device 805 may receive, a feedback message. In some aspects, the feedback message may acknowledge receipt of the DCI. As shown by reference number 825, the UE 120 may perform a BWP switching procedure to switch to the indicated target BWP. As shown by reference number 830, the wireless communication device 805 may transmit, and the UE 120 may receive, a resource allocation. In some aspects, the wireless communication device 805 may transmit the resource allocation based at least in part on receiving the feedback message. In some aspects, the resource allocation may include uplink resources, and the UE 120 may transmit a scheduling request, using the uplink resources and the target BWP.

As indicated above, FIG. 8 is provided as an example. Other examples may differ from what is described with regard to FIG. 8.

Figure 9:
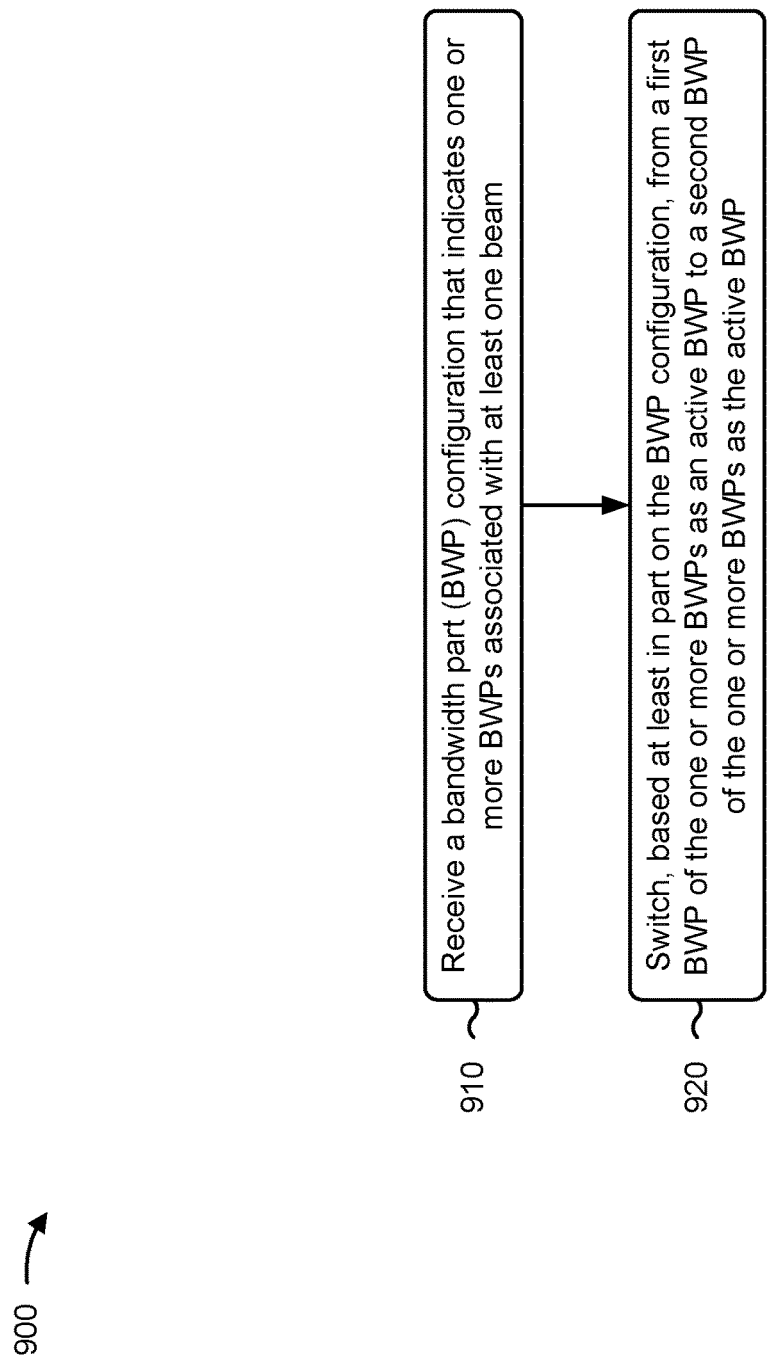
FIGS. 9 and 10 are diagrams illustrating example processes associated with BWP switching, in accordance with the present disclosure.

FIG. 9 is a diagram illustrating an example process 900 performed, for example, by a UE, in accordance with the present disclosure. Example process 900 is an example where the UE (e.g., UE 120 and/or the like) performs operations associated with BWP switching.

As shown in FIG. 9, in sonic aspects, process 900 may include receiving a BWP configuration that indicates one or more BWPs associated with at least one beam (block 910), For example, the UE (e.g., using receive processor 258, controller/processor 280, memory 282, and/or the like) may receive a BWP configuration that indicates one or more BWPs associated with at least one beam, as described above.

As further shown in FIG. 9, in some aspects, process 900 may include switching, based at least in part on the BWP configuration, from a first BWP of the one or more BWPs as an active BWP to a second BWP of the one or more BWPs as the active BWP (block 920). For example, the UE (e.g., using receive processor 258, transmit processor 264, controller/processor 280, memory 282, and/or die like) may switch, based at least in part on the BWP configuration, from a first BWP of the one or more BWPs as an active BWP to a second BWP of the one or more BWPs as the active BWP, as described above.

Process 900 may include additional aspects, such as any single aspect or any combination of aspects described below and/or in connection with one or more other processes described elsewhere herein.

With respect to process 900, in some aspects, the BWP configuration is carried in at least one of an RRC message, DCI, a MAC-CE, an SIB, or a combination thereof.

With respect to process 900, in some aspects, the at least one beam is associated with a non-terrestrial wireless communication device.

With respect to process 900, in some aspects, the non-terrestrial wireless communication device is a non-terrestrial base station or a non-terrestrial relay station.

With respect to process 900, in some aspects, the process includes receiving, from a wireless communication device associated with the at least one beam, a broadcast message comprising an indication of one or more beam parameters associated with the at least one beam, the one or more beam parameters indicating at least one of: a Doppler frequency pre-compensation value associated with the at least one beam, a target location within a beam footprint associated with the at least one beam, a timing adjustment parameter associated with the at least one beam, or a combination thereof.

With respect to process 900 in some aspects, the target location comprises a center location of the beam footprint.

With respect to process 900, in some aspects, the timing adjustment parameter comprises an offset parameter corresponding to a delay component between the wireless communication device and the UE within the beam footprint.

With respect to process 900, in some aspects, the BWP configuration indicates: a first initial UL BWP associated with a first beam, a first initial DL BWP associated with the first beam, a second initial UL BWP associated with a second beam, and a second initial DL BWP associated with the second beam.

With respect to process 900, in some aspects, the BWP configuration indicates a first default UL BWP associated with a first beam, a first default DL BWP associated with the first beam, a second default UL BWP associated with a second beam, and a second default DL BWP associated with the second beam.

With respect to process 900, in some aspects, the BWP configuration does not include a configuration of at least one default BWP associated with the at least one beam, and at least one configured initial BWP associated with the at least one beam comprises the at least one default BWP.

With respect to process 900, in some aspects, the process includes receiving a beam switch time configuration that indicates a beam switch time associated with a switch, by the UE, from a first beam to a second beam as an active beam.

With respect to process 900, in some aspects, the process includes transmitting an indication of a maximum beam switch time associated with the UE, wherein the beam switch time is based at least in part on the maximum beam switch time.

With respect to process 900, in some aspects, the process includes transmitting an indication of an antenna type associated with the UE, wherein the beam switch time is based at least in part on the antenna type.

With respect to process 900, in some aspects, the antenna type comprises at least one of a motor steered antenna type, an active electronically scanned array type, or a combination thereof.

With respect to process 900, in some aspects, the process includes receiving a pre-compensation switch time configuration that indicates a pre-compensation switch time associated with a switch, by the user equipment, from a first frequency pre-compensation to a second frequency pre-compensation as an active pre-compensation.

With respect to process 900, in some aspects, the process includes switching from the first BWP to the second BWP by performing a BWP switching procedure comprising an inter-beam BWP switching procedure, wherein the first BWP is associated with a first beam of the at least one beam and the second BWP is associated with a second beam of the at least one beam, or an intra-beam BWP switching procedure, wherein the first BWP is associated with the first beam of the at least one beam and the second BWP is associated with the first beam of the at least one beam.

With respect to process 900, in some aspects, the BWP configuration indicates the inter-beans. BWP switching procedure, the first BWP, an association between the first BWP and the first beam, the second BWP, an association between the second BWP and the second beam, or a combination thereof.

With respect to process 900, in some aspects, the inter-beano BWP switching procedure is configured using at least one of an RRC message, an SIB, or a combination thereof.

With respect to process 900, in some aspects, the BWP configuration indicates the intra-beam BWP switching procedure, the first BWP, an association between the first BWP and the first beam, the second BWP, an association between the second BWP and the first beam, or a combination thereof.

With respect to process 900, in some aspects, the intra-beam BWP switching procedure is configured using an RRC message.

With respect to process 900, in some aspects, the BWP configuration indicates a maximum number of BWPs.

With respect to process 900, in some aspects, them maximum number of BWPs is greater than four.

With respect to process 900, in some aspects, the maximum number of BWPs comprises a maximum number of intra-beam BWPs, a maximum number of inter-beam BWPs, or a combination thereof.

With respect to process 900, in some aspects, a BWP of the one or more BWPs is associated with a beam of a serving wireless communication device or a beam of an additional wireless communication device.

With respect to process 900, in some aspects, the BWP configuration is carried in an RRC message that indicates the second BWP as a target BWP for switching.

With respect to process 900, in some aspects, the second BWP comprises an active UL BWP or an active DL BWP.

With respect to process 900, in some aspects, the RRC message comprises a setup message or a reconfiguration message.

With respect to process 900, in some aspects, the process includes switching from the first BWP as an active BWP to the second BWP as the active BWP, and from a serving beam to a target beam associated with the second BWP, within a configured switch time delay based at least in part on the target beam being different than the serving beam.

With respect to process 900, in some aspects, the BWP configuration is carried in DCI that comprises a first set of indices associated with intra-beam BWPs and a second set of indices associated with inter-beam BWPs.

With respect to process 900, in some aspects, the BWP configuration is carried in DCI comprising a BWP ID field having a maximum number of bits that is greater than two.

With respect to process 900, in some aspects, the BWP type comprises an inter-beam BWP type, and the process 900 includes resetting a default BWP associated with the UE to correspond to a default BWP associated with a target beam associated with the second BWP.

With respect to process 900, in some aspects, the BWP configuration is carried in DCI that indicates a BWP type corresponding to the one or more BWPs.

With respect to process 900, in some aspects, the DCI indicates a BWP ID corresponding to the second BWP, wherein the BWP type corresponds to the second BWP, and wherein process 900 further comprises switching to the second BWP based at least in part on the BWP identifier and the BWP type.

With respect to process 900, in some aspects, the DCI indicates the BWP type using a BWP type field having at least one bit.

With respect to process 900, in some aspects, the process includes directly decoding a PDCCH payload containing the DCI to extract the at least one bit.

With respect to process 900, in some aspects, the DCI indicates the BWP type using a first scrambling sequence applied to a rate-matched channel encoder output, wherein the first scrambling sequence indicates a first BAT type, or a second scrambling sequence applied to the rate-matched channel encoder output, and wherein the second scrambling sequence indicates a second BWP type.

With respect to process 900, in some aspects, the process includes blindly decoding a physical downlink control channel payload containing the downlink control information using the first scrambling sequence and the second scrambling sequence.

With respect to process 900, in some aspects, the downlink control information indicates the BWP type using a first RNTI sub-type of an RNTI to indicate a first BWP type, or a second RNTI sub-type of an RNTI to indicate a second BWP type.

With respect to process 900, in some aspects, the RNTI comprises a C-RNTI, a CS-RNTI, or an MCS-C-RNTI.

With respect to process 900, in some aspects, the process includes blindly decoding a PDCCH payload containing the DCI using the first. RNTI sub-type and the second RNTI sub-type.

With respect to process 900, in some aspects, the DCI indicates the BWP type using a first DMRS sequence that indicates a first BWP type, or a second DMRS sequence that indicates a second BWP type.

With respect to process 900, in some aspects, the process includes determining the BWP type by determining that the first DMRS sequence is associated with a correct CRC, or the second DMRS sequence is associated with the correct CRC.

With respect to process 900, in some aspects, the BWP configuration is carried in DCI, and process 900 includes receiving a BWP type indicator, wherein the BWP type indicator is carried in an encoded communication comprising the DCI.

With respect to process 900, in some aspects, the process includes directly decoding a PDCCH payload containing the encoded communication to extract the BWP type indicator.

With respect to process 900, in some aspects, the BWP configuration configures a BWP ID field to include a tuple having a unique tuple ID that indicates a BWP ID and a beam ID.

With respect to process 900, in some aspects, the beam ID comprises at least one of a cell ID, an SSB index, a dedicated beam ID, or a combination thereof.

With respect to process 900, in some aspects, the beam ID indicates a target beam identified based at least in part on a determination that the UE is likely to intercept the target beam.

With respect to process 900, in some aspects, the determination is made based at least in part on a mobility state of the beam.

With respect to process 900, in some aspects, the BWP configuration is carried in an RRC message, and process 900 includes receiving DCI comprising the BWP ID field including the tuple.

With respect to process 900, in some aspects, the BWP ID field comprises more than two bits.

With respect to process 900, in sonic aspects, the process includes switching from the first BWP to the second BWP based at least in part on the tuple indicating the second BWP.

With respect to process 900, in some aspects, the process includes resetting a default BWP associated with the user equipment to correspond to a default BWP associated with a target beam associated with the second BWP.

With respect to process 900, in some aspects, the BWP configuration indicates the one or more BWPs by indicating one or more corresponding BWP IDs, and the BWP configuration is carried in DCI based at least in part on the one or more BWPs comprising one or more intra-beam BWPs, or a MAC-CE based at least in part on the one or more BWPs comprising one or more inter-beam BWPs.

With respect to process 900, in some aspects, the BWP configuration indicates the one or more BWPs by indicating one or more corresponding BWP IDs, and the BWP configuration is carried in DCI based at least in part on the one or more BWPs comprising one or more intra-beam BWPs, or an RRC message based at least in part on the one or more BWPs comprising one or more inter-beam BWPs.

With respect to process 900, in some aspects, the BWP configuration indicates the one or more BWPs by indicating one or more corresponding BWP IDs, and the BWP configuration is carried in DCI based at least in part on the one or more BWPs comprising one or more inter-beam BWPs, or a MAC-CE based at least in part on the one or more BWPs comprising one or more intra-beam BWPs, or an RRC message based at least in part on the one or more BWPs comprising one or more intra-beam BWPs.

With respect to process 900, in some aspects, the first BWP is associated with a first beam and the second BWP is associated with a second beam, and process 900 further comprises receiving DCI having a dedicated DCI format corresponding to inter-beam BWP switching.

With respect to process 900, in some aspects, the process includes switching from the first BWP to the second BWP based at least in part on the DCI.

With respect to process 900, in some aspects, the dedicated DCI format comprises a set of resource elements that indicate at least one of an inter-beam BWP ID, a wireless communication device ID, a beam ID, or a combination thereof.

With respect to process 900, in some aspects, the inter-beam BWP ID indicates at least one of an initial UL BWP, an initial DL BWP, a default UL BWP, a DL downlink BWP, or a combination thereof.

With respect to process 900, in some aspects, the beam ID comprises at least one of a cell ID, an SSB index, a dedicated beam ID, or a combination thereof.

With respect to process 900, in sonic aspects, the process includes receiving an indication of the dedicated DCI format.

With respect to process 900, in sonic aspects, the indication comprises at least one of an RRC configured search space, a C-RNTI used to address the UE and a format ID field in the DCI, an inter-beam BWP switching RNTI used to address the UE, a specified scrambling sequence applied to a rate-matched channel encoder output, a specified DMRS sequence, a dedicated DCI format ID that is encoded into an encoded message that includes the DCI, or a combination thereof.

With respect to process 900, in some aspects, the process includes transmitting a feedback message that acknowledges receipt of the DCI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
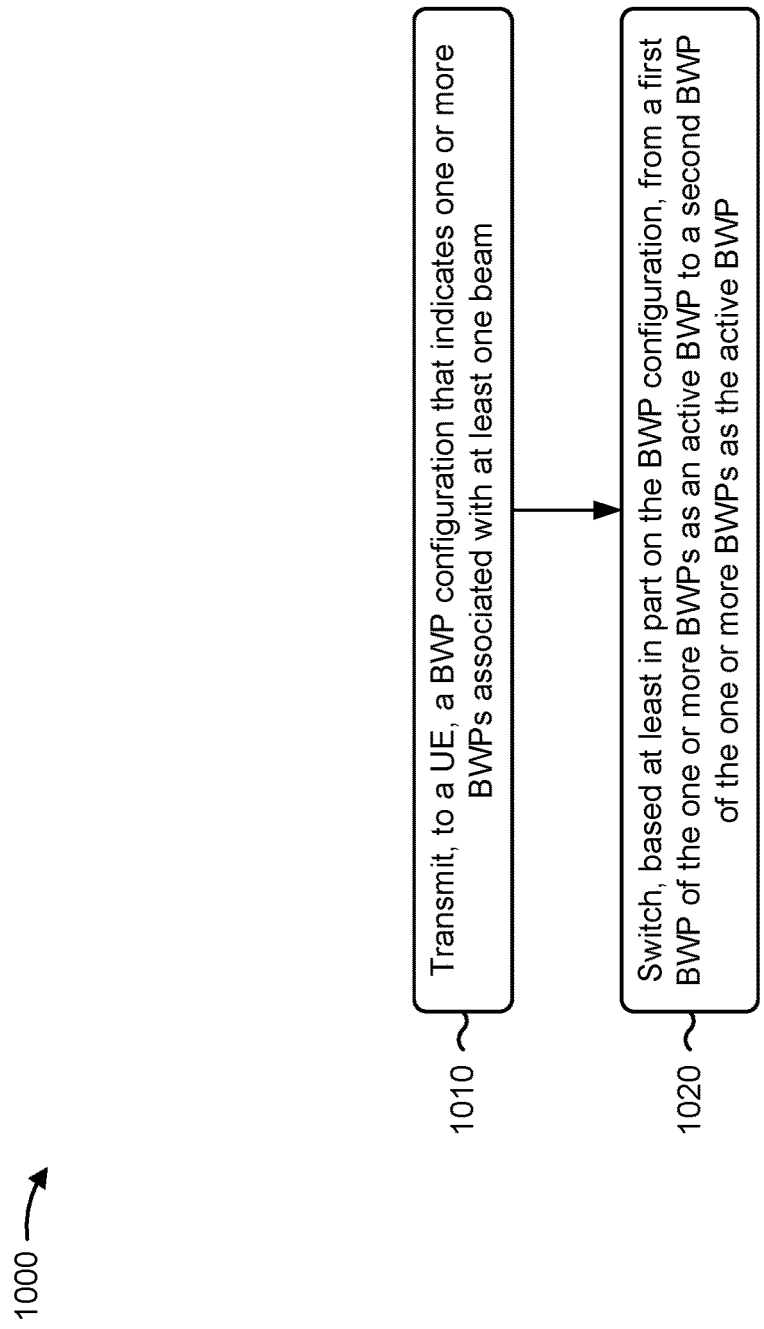

FIG. 10 is a diagram illustrating an example process 1000 performed, for example, by a wireless communication device, in accordance with the present disclosure. Example process 1000 is an example where the wireless communication device (e.g., wireless communication device 505, wireless communication device 605, wireless communication device 705, wireless communication device 805, and/or the like) performs operations associated with BWP switching.

As shown in FIG. 10, in some aspects, process 1000 may include transmitting, to a UE, a BWP configuration that indicates one or more BWPs associated with at least one beam (block 1010). For example, the wireless communication device (e.g., using transmit processor 220, controller/processor 240, memory 242, and/or the like) may transmit, to a UE, a BWP configuration that indicates one or more BWPs associated with at least one beam, as described above.

As further shown in FIG. 10, in some aspects, process 1000 may include switching, based at least in part on the BWP configuration, from a first BWP of the one or more BWPs as an active BWP to a second BWP of the one or more BWPs as the active BWP (block 1020). For example, the wireless communication device (e.g., using transmit processor 220, receive processor 238, controller/processor 240, memory 242, and/or the like) may switch, based at least in part on the BWP configuration, from a first BWP of the one or more BWPs as an active BWP to a second BWP of the one or more BWPs as the active BWP, as described above.

Process 1000 may include additional aspects, such as any single aspect or any combination of aspects described below and/or in connection with one or more other processes described elsewhere herein.

With respect to process 1000, in some aspects, the BWP configuration is carried in at least one of an RRC message, DCI, a MAC-CE, an SIB, or a combination thereof.

With respect to process 1000, in some aspects, the wireless communication device comprises a non-terrestrial wireless communication device.

With respect to process 1000, in some aspects, the non-terrestrial wireless communication device is a non-terrestrial base station or a non-terrestrial relay station.

With respect to process 1000, in some aspects, the process includes transmitting a broadcast message comprising an indication of one or more beam parameters associated with the at least one beam, the one or more beam parameters indicating at least one of a Doppler frequency pre-compensation value associated with the at least one beam, a target location within a beam footprint associated with the at least one beam, a timing adjustment parameter associated with the at least one beam, or a combination thereof.

With respect to process 1000, in some aspects, the target location comprises a center location of the beam footprint.

With respect to process 1000, in some aspects, the timing adjustment parameter comprises an offset parameter corresponding to a delay component between the wireless communication device and the UE within the beam footprint.

With respect to process 1000, in some aspects, the BWP configuration indicates a first initial UL BWP associated with a first beam, a first initial DL BWP associated with the first beam, a second initial UL BWP associated with a second beam, and a second initial DL BWP associated with the second beam.

With respect to process 1000, in some aspects, the BWP configuration indicates a first default UL BWP associated with a first beam, a first default DL BWP associated with the first beam, a second default UL BWP associated with a second beam, and a second default DL BWP associated with the second beam.

With respect to process 1000, in sonic aspects, the BWP configuration does riot include a configuration of at least one default BWP associated with the at least one beam, and at least one configured initial BWP associated with the at least one beam comprises the at least one default BWP.

With respect to process 1000, in sonic aspects, the process includes transmitting a beam switch time configuration that indicates a beam switch time associated with a switch, by the UE, from a first beam to a second beam as an active beam.

With respect to process 1000, in some aspects, the process includes receiving an indication of a maximum beam switch time associated with the UE, and determining the beam switch time based at least in part on the maximum beam switch time.

With respect to process 1000, in some aspects, the process includes receiving an indication of an antenna type associated with the UE, and determining the beam switch time based at least in part on the antenna type.

With respect to process 1000, in soiree aspects, the antenna type comprises at least one of a motor steered antenna type, an active electronically scanned array type, or a combination thereof.

With respect to process 1000, in sonic aspects, the process includes transmitting a pre-compensation switch time configuration that indicates a pre-compensation switch time associated with a switch, by the UE, from a first frequency pre-compensation to a second frequency pre-compensation as an active pre-compensation.

With respect to process 1000, in some aspects, the process includes switching from the first BWP to the second BWP by performing a BWP switching procedure comprising an inter-beam BWP switching procedure, wherein the first BWP is associated with a first beam of the at least one beam and the second BWP is associated with a second beam of the at least one beam, or an intra-beam BWP switching procedure, and wherein the first BWP is associated with the first beam of the at least one beam and the second BWP is associated with the first beam of the at least one beam.

With respect to process 1000, in some aspects, the BAT configuration indicates the inter-beam BWP switching procedure, the first BWP, an association between the first BWP and the first beam, the second BWP, an association between the second BWP and the second beam, or a combination thereof.

With respect to process 1000, in some aspects, the inter-beam BWP switching procedure is configured using at least one of an RRC message, an SIB, or a combination thereof.

With respect to process 1000, in some aspects, the BWP configuration indicates the intra-beam BWP switching procedure, the first BWP, an association between the first BWP and the first beam, the second BWP, an association between the second BWP and the first beam, or a combination thereof.

With respect to process 1000, in some aspects, the intra-beam BWP switching procedure is configured using an RRC message.

With respect to process 1000, in some aspects, the BWP configuration indicates a maximum number of BWPs.

With respect to process 1000, in some aspects, the maximum number of BWPs is greater than four.

With respect to process 1000, in some aspects, the maximum number of BWPs comprises a maximum number of intra-beam BWPs, a maximum number of inter-beam BWPs, or a combination thereof.

With respect to process 1000, in some aspects, a BWP of the one or more BWPs is associated with a beam of the wireless communication device, wherein the wireless communication device is a serving wireless communication device, or a beam of an additional wireless communication device.

With respect to process 1000, in some aspects, the BWP configuration is carried in an RRC message that indicates the second BWP as a target BWP for switching.

With respect to process 1000, in some aspects, the second BWP comprises an active UL BWP or an active DL BWP.

With respect to process 1000, in some aspects, the RRC message comprises a setup message or a reconfiguration message.

With respect to process 1000, in some aspects, the BWP configuration is carried in DCI that comprises a first set of indices associated with intra-beam BWPs and a second set of indices associated with inter-beam BWPs.

With respect to process 1000, in some aspects, the BWP configuration is carried in DCI comprising a BWP ID field having a maximum number of bits that is greater than two.

With respect to process 1000, in some aspects, the BWP configuration is carried in DCI that indicates a BWP type corresponding to the one or more BWPs.

With respect to process 1000, in some aspects, the DCI indicates a BWP ID corresponding to the second BWP, the BWP type corresponds to the second BWP, and process 1000 includes switching to the second BWP based at least in part on the BWP ID and the BWP type.

With respect to process 1000, in some aspects, the DCI indicates the BWP type using a BWP type field having at least one bit.

With respect to process 1000, in some aspects, the process includes applying a first scrambling sequence to a rate-matched channel encoder output, wherein the first scrambling sequence indicates a first BWP type, or applying a second scrambling sequence to the rate-matched channel encoder output, wherein the second scrambling sequence indicates a second BWP type.

With respect to process 1000, in sonic aspects, the process includes scrambling a set of CRC bits using a first RNTI having a first RNTI sub-type to indicate a first BWP type, or scrambling the set of CRC bits using a second RNTI having a second. RNTI sub-type to indicate a second BWP type.

With respect to process 1000, in some aspects, the first RNTI or the second RNTI comprises a C-RNTI, a CS-RNTI, or an MCS-C-RNTI.

With respect to process 1000, in some aspects, the process includes transmitting a first DMRS sequence that indicates a first BWP type, or transmitting a second DMRS sequence that indicates a second BWP type.

With respect to process 1000, in some aspects, the BWP configuration is carried in DCI, and process 1000 includes generating an encoded communication comprising the DCI and a BWP type indicator and transmitting the encoded communication.

With respect to process 1000, in some aspects, the BWP configuration configures a BWP ID field to include a tuple having a unique tuple ID that indicates a BWP ID corresponding to the second BWP and a beam ID corresponding to a target beam.

With respect to process 1000, in some aspects, the beam ID comprises at least one of a cell ID, an SSB index, a dedicated beam ID, or a combination thereof.

With respect to process 1000, in some aspects, the process includes determining that the LIE is likely to intercept the target beam, wherein the beam ID indicates the target beam based at least in part on the determination that the UE is likely to intercept the beam.

With respect to process 1000, in some aspects, the process includes determining that the UE is likely to intercept the target beam based at least in part on a mobility state of the beam.

With respect to process 1000, in some aspects, the BWP configuration is carried in an RRC message, and process 1000 further comprises transmitting DCI comprising the BWP field including the tuple.

With respect to process 1000, in some aspects, the BWP ID field comprises more than two bits.

With respect to process 1000, in some aspects, the BWP configuration indicates the one or more BWPs by indicating one or more corresponding BWP IDs, and the BWP configuration is carried in DCI based at least in part on the one or more BWPs comprising one or more intra-beam BWPs, or a MAC-CE based at least in part on the one or more BWPs comprising one or more inter-beam BWPs.

With respect to process 1000, in some aspects, the BWP configuration indicates the one or more BWPs by indicating one or more corresponding BWP IDs, and the BWP configuration is carried in DCI based at least in part on the one or more BWPs comprising one or more intra-beam BWPs, or an RRC message based at least in part on the one or more BWPs comprising one or more inter-beam BWPs.

With respect to process 1000, in sonic aspects, the BWP configuration indicates the one or more BWPs by indicating one or mote corresponding BWP IDs, and the BWP configuration is carried in DCI based at least in pall on the one or more BWPs comprising one or more inter-beam BWPs, a MAC-CE based at least in part on the one or more BWPs comprising one or more intra-beam BWPs, or an RRC message based at least in part on the one or more BWPs comprising one or more intra-beam BWPs.

With respect to process 1000, in some aspects, the first BWP is associated with a first beam and the second BWP is associated with a second beam, and process 1000 includes transmitting DCI having a dedicated DCI format corresponding to inter-beam BWP switching.

With respect to process 1000, in some aspects, the dedicated DCI format comprises a set of resource elements that indicate at least one of an inter-beam BWP ID, a wireless communication device ID, a beam ID, or a combination thereof.

With respect to process 1000, in some aspects, the inter-beam BWP ID indicates at least one of an initial UL BWP, an initial DL BWP, a default UL BWP, a default DL BWP, or a combination thereof.

With respect to process 1000, in some aspects, the beam ID comprises at least one of a cell ID, an SSB index, a dedicated beam ID, or a combination thereof.

With respect to process 1000, in sonic aspects, the process includes transmitting an indication of the dedicated DCI format.

With respect to process 1000, in some aspects, the indication comprises at least one of an RRC configured search space, a C-RNTI used to address the UE and a format ID field in the DCI, an inter-beam BWP switching RNTI used to address the UE, a specified scrambling sequence applied to a rate-matched channel encoder output, a specified DMRS sequence, a dedicated DCI format ID that is encoded into an encoded message that includes the DCI, or a combination thereof.

With respect to process 1000, in some aspects, the process includes receiving a feedback message that acknowledges receipt of the DCI.

With respect to process 1000, in some aspects, the process includes transmitting a resource allocation comprising UL resources, and receiving a scheduling request based at least in part on the UL resources and the second BWP.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment, the method comprising: receiving a bandwidth part configuration that indicates one or more bandwidth parts associated with at least one beam, and switching, based at least in part on the bandwidth part configuration, from a first bandwidth part of the one or more bandwidth parts as an active bandwidth part to a second bandwidth part of the one or more bandwidth parts as the active bandwidth part.

Aspect 2: The method of Aspect 1, wherein the bandwidth part configuration is carried in at least one of: a radio resource control message, downlink control information, a medium access control control element, a system information block, or a combination thereof.

Aspect 3: The method of either of Aspects 1 or 2, wherein the at least one beam is associated with a non-terrestrial wireless communication device.

Aspect 4: The method of Aspect 3, wherein the non-terrestrial wireless communication device is a non-terrestrial base station or a non-terrestrial relay station.

Aspect 5: The method of any of Aspects 1-4, further comprising receiving, from a wireless communication device associated with the at least one beam, a broadcast message comprising an indication of one or more beam parameters associated with the at least one beam, the one or more beam parameters indicating at least one of: a Doppler frequency pre-compensation value associated with the at least one beam, a target location within a beam footprint associated with the at least one beam, a timing adjustment parameter associated with the at least one beam, or a combination thereof.

Aspect 6: The method of Aspect 5, wherein the target location comprises a center location of the beam footprint.

Aspect 7: The method of either of Aspects 5 or 6, wherein the timing adjustment parameter comprises an offset parameter corresponding to a delay component between the wireless communication device and the user equipment within the beam footprint.

Aspect 8: The method of any of Aspects 1-7, wherein the bandwidth part configuration indicates: a first initial uplink bandwidth part associated with a first beam, a first initial downlink bandwidth part associated with the first beam, a second initial uplink bandwidth part associated with a second beam, and a second initial downlink bandwidth part associated with the second beam.

Aspect 9: The method of any of Aspects 1-8, wherein the bandwidth part configuration indicates: a first default uplink bandwidth part associated with a first beam, a first default downlink bandwidth part associated with the first beam, a second default uplink bandwidth part associated with a second beam, and a second default downlink bandwidth part associated with the second beam.

Aspect 10: The method of any of Aspects 1-9, wherein the bandwidth part configuration does not include a configuration of at least one default bandwidth part associated. with the at least one beam, and wherein at least one configured initial bandwidth part associated with the at least one beam comprises the at least one default bandwidth part.

Aspect 11: The method of any of Aspects 110, further comprising receiving a beam switch time configuration that indicates a beam switch time associated with a switch, by the user equipment, from a first beam to a second beam as an active beam.

Aspect 12: The method of Aspect 11, further comprising transmitting an indication of a maximum beam switch time associated with the user equipment, wherein the beam switch time is based at least in part on the maximum beam switch time.

Aspect 13: The method of either of Aspects 11 or 12, further comprising transmitting an indication of an antenna type associated with the user equipment, wherein the beam switch tithe is based at least in part on the antenna type.

Aspect 14: The method of Aspect 13, wherein the antenna type comprises at least one of: a motor steered antenna type, an active electronically scanned array type, or a combination thereof.

Aspect 15: The method of any of Aspects 1-14, further comprising receiving a pre-compensation switch time configuration that indicates a pre-compensation switch time associated with a switch, by the user equipment, from a first frequency pre-compensation to a second frequency pre-compensation as an active pre-compensation.

Aspect 16: The method of any of Aspects 1-15, further comprising switching from the first bandwidth part to the second bandwidth part by performing a bandwidth part switching procedure comprising: an inter-beam bandwidth part switching procedure, wherein the first bandwidth part is associated with a first beam of the at least one beam and the second bandwidth part is associated with a second beam of the at least one beam, or an intra-beam bandwidth part switching procedure, wherein the first bandwidth part is associated with the first beam of the at least one beam and the second bandwidth part is associated with the first beam of the at least one beam.

Aspect 17: The method of Aspect 16, wherein the bandwidth part configuration indicates: the inter-beam bandwidth part switching procedure, the first bandwidth part, an association between the first bandwidth part and the first beam, the second bandwidth part, an association between the second bandwidth part and the second beam, or a combination thereof.

Aspect 18: The method of Aspect 17, wherein the inter-beam bandwidth part switching procedure is configured using at least one of: a radio resource control message, a system information block, or a combination thereof.

Aspect 19: The method of any of Aspects 16-18, wherein the bandwidth part configuration indicates: the intra-beam bandwidth part switching procedure, the first bandwidth part, an association between the first bandwidth part and the first beam, the second bandwidth part, an association between the second bandwidth part and the first beam, or a combination thereof.

Aspect 20: The method of Aspect 19, wherein the intra-beam bandwidth part switching procedure is configured using a radio resource control message.

Aspect 21: The method of any of Aspects 1-20, wherein the bandwidth part configuration indicates a maximum number of bandwidth parts.

Aspect 22: The method of Aspect 21, wherein the maximum number of bandwidth parts is greater than four.

Aspect 23: The method of either of Aspects 21 or 22, wherein the maximum number of bandwidth parts comprises: a maximum number of intra-beam bandwidth parts, a maximum number of inter-beam bandwidth parts, or a combination thereof.

Aspect 24: The method of any of Aspects 1-23, wherein a bandwidth part of the one or more bandwidth parts is associated with a beam of a serving wireless communication device or a beam of an additional wireless communication device.

Aspect 25: The method of any of Aspects 1-24, wherein the bandwidth part configuration is carried in a radio resource control message that indicates the second bandwidth part as a target bandwidth part for switching.

Aspect 26: The method of Aspect 25, wherein the second bandwidth part comprises an active uplink bandwidth part or an active downlink bandwidth part.

Aspect 27: The method of either of Aspects 25 or 26, wherein the radio resource control message comprises a setup message or a reconfiguration message.

Aspect 28: The method of any of Aspects 1-27, further comprising switching from the first bandwidth part as an active bandwidth part to the second bandwidth part as the active bandwidth part, and from a serving beam to a target beam associated with the second bandwidth part, within a configured switch time delay based at least in part on the target beam being different than the serving beam.

Aspect 29: The method of any of Aspects 1-28, wherein the bandwidth part configuration is carried in downlink control information that comprises a first set of indices associated with intra-beam bandwidth parts and a second set of indices associated with inter-beam bandwidth parts.

Aspect 30: The method of any of Aspects 1-29, wherein the bandwidth part configuration is carried in downlink control information comprising a bandwidth part identification field having a maximum number of bits that is greater than two.

Aspect 31: The method of any of Aspects 1-30, wherein the bandwidth part type comprises an inter-beam bandwidth part type, and wherein the method further comprises resetting a default bandwidth part associated with the user equipment to correspond to a default bandwidth part associated with a target beam associated with the second bandwidth part.

Aspect 32: The method of any of Aspects 1-31, wherein the bandwidth part configuration is carried in downlink control information that indicates a bandwidth part type corresponding to the one or more bandwidth parts.

Aspect 33: The method of Aspect 32, wherein the downlink control information indicates a bandwidth part identifier corresponding to the second bandwidth part, wherein the bandwidth part type corresponds to the second bandwidth part, and wherein the method further comprises switching to the second bandwidth part based at least in part on the bandwidth part identifier and the bandwidth part type.

Aspect 34: The method of either of Aspects 32 or 33, wherein the downlink control information indicates the bandwidth part type using a bandwidth part type field having at least one bit.

Aspect 35: The method of Aspect 34, further comprising directly decoding a physical downlink control channel payload containing the downlink control information to extract the at least one bit.

Aspect 36: The method of any of Aspects 32-35, wherein the downlink control information indicates the bandwidth part type using: a first scrambling sequence applied to a rate-matched channel encoder output, wherein the first scrambling sequence indicates a first bandwidth part type, or a second scrambling sequence applied to the rate-matched channel encoder output, wherein the second scrambling sequence indicates a second bandwidth part type.

Aspect 37: The method of Aspect 36, further comprising blindly decoding a physical downlink control channel payload containing the downlink control information using the first scrambling sequence and the second scrambling sequence.

Aspect 38: The method of any of Aspects 32-37, wherein the downlink control information indicates the bandwidth part type using: a first radio network temporary identifier sub-type of a radio network temporary identifier to indicate a first bandwidth part type, or a second radio network temporary identifier sub-type of a radio network temporary identifier to indicate a second bandwidth part type.

Aspect 39: The method of Aspect 38, wherein the radio network temporary identifier comprises: a cell radio network temporary identifier, a configured scheduling radio network temporary identifier, or a modulation and coding scheme cell radio network temporary identifier.

Aspect 40: The method of either of Aspects 38 or 39, further comprising blindly decoding a physical downlink control channel payload containing the downlink control information using the first radio network temporary identifier sub-type and the second radio network temporary identifier sub-type.

Aspect 41: The method of any of Aspects 32-40, wherein the downlink control information indicates the bandwidth part type using: a first demodulation reference signal sequence that indicates a first bandwidth pan type, or a second demodulation reference signal sequence that indicates a second bandwidth part type.

Aspect 42: The method of Aspect 41, further comprising determining the bandwidth pan type by determining that: the first demodulation reference signal sequence is associated with a correct cyclic redundancy check, or the second demodulation reference signal sequence is associated with the correct cyclic redundancy check.

Aspect 43: The method of any of Aspects 1-42, wherein the bandwidth part configuration is carried in downlink control information, and wherein the method further comprises receiving a bandwidth part type indicator, wherein the bandwidth part type indicator is carried in an encoded communication comprising the downlink control information.

Aspect 44: The method of Aspect 43, further comprising directly decoding a physical downlink control channel payload containing the encoded communication to extract the bandwidth part type indicator.

Aspect 45: The method of any of Aspects 1-44, wherein the bandwidth part configuration configures a bandwidth part identifier field to include a tuple having a unique tuple identifier that indicates a bandwidth part identifier and a beam identifier.

Aspect 46: The method of Aspect 45, wherein the beam identifier comprises at least one of: a cell identifier, a synchronization signal block index, a dedicated beam identifier, or a combination thereof.

Aspect 47: The method of either of Aspects 45 or 46, wherein the beam identifier indicates a target beam identified based at least in part on a determination that the user equipment is likely to intercept the target beam.

Aspect 48: The method of Aspect 47, wherein the determination is made based at least in part on a mobility state of the beam.

Aspect 49: The method of any of Aspects 45-48, wherein the bandwidth part configuration is carried in a radio resource control message, and wherein the method further comprises receiving downlink control information comprising the bandwidth part identifier field including the tuple.

Aspect 50: The method of any of Aspects 45-49, wherein the bandwidth part identifier field comprises inure than two bits.

Aspect 51: The method of any of Aspects 45-50, further comprising switching from the first bandwidth part to the second bandwidth part based at least in part on the tuple indicating the second bandwidth part.

Aspect 52: The method of any of Aspects 45-51, further comprising resetting a default bandwidth part associated with the user equipment to correspond to a default bandwidth part associated with a target beam associated with the second bandwidth part.

Aspect 53: The method of any of Aspects 1-52. wherein the bandwidth part configuration indicates the one or more bandwidth parts by indicating one or more corresponding bandwidth part identifiers, and wherein the bandwidth part configuration is carried in: downlink control information based at least in part on the one or more bandwidth parts comprising one or more intra-beam bandwidth parts, or a medium access control control element based at least in part on the one or more bandwidth parts comprising one or more inter-beam bandwidth parts.

Aspect 54: The method of any of Aspects 1-53, wherein the bandwidth part configuration indicates the one or more bandwidth parts by indicating one or more corresponding bandwidth part identifiers, and wherein the bandwidth part configuration is carried in: downlink control information based at least in part on the one or more bandwidth parts comprising one or more intra-beam bandwidth parts, or a radio resource control message based at least in part on the one or more bandwidth parts comprising one or more inter-beam bandwidth parts.

Aspect 55: The method of any of Aspects 1-54, wherein the bandwidth part configuration indicates the one or more bandwidth parts by indicating one or more corresponding bandwidth part identifiers, and wherein the bandwidth part configuration is carried in: downlink control information based at least in part on the one or more bandwidth parts comprising one or more inter-beam bandwidth parts, a medium access control control element based at least in part on the one or more bandwidth parts comprising one or more intra-beam bandwidth parts, or a radio resource control message based at least in part on the one or more bandwidth parts comprising one or more intra-beam bandwidth parts.

Aspect 56: The method of any of Aspects 1-55, wherein the first bandwidth part is associated with a first beam and the second bandwidth part is associated with a second beam, and wherein the method further comprises receiving downlink control information having a dedicated downlink control information format corresponding to inter-beam bandwidth part switching.

Aspect 57: The method of Aspect 56, further comprising switching from the first bandwidth part to the second bandwidth part based at least in part on the downlink control information.

Aspect 58: The method of either of Aspects 56 or 57, herein the dedicated downlink control information format comprises a set of resource elements that indicate at least one of: an inter-beam bandwidth part identifier, a wireless communication device identifier, a beam identifier, or a combination thereof.

Aspect 59: The method of Aspect 58, wherein the inter-beam bandwidth part identifier indicates at least one of: an initial uplink bandwidth part, an initial downlink bandwidth part, a default uplink bandwidth part, a default downlink bandwidth part, or a combination thereof.

Aspect 60: The method of either of Aspects 58 or 59, wherein the beam identifier comprises at least one of: a cell identifier, a synchronization signal block index, a dedicated beam identifier, or a combination thereof.

Aspect 61: The method of any of Aspects 56-60, further comprising receiving an indication of the dedicated downlink control information format.

Aspect 62: The method of Aspect 61, wherein the indication comprises at least one of: a radio resource control configured search space, a cell radio network temporary identifier used to address the user equipment and a format identifier field in the downlink control information, an inter-beam bandwidth part switching radio network temporary identifier used to address the user equipment, a specified scrambling sequence applied to a rate-matched channel encoder output, a specified demodulation reference signal sequence, a dedicated downlink control information format identifier that is encoded into an encoded message that includes the downlink control information, or a combination thereof.

Aspect 63: The method of any of Aspects 56-62, further comprising transmitting a feedback message that acknowledges receipt of the downlink control information.

Aspect 64: The method of Aspect 63, further comprising receiving a resource allocation comprising uplink resources; and transmitting a scheduling request, using the uplink resources and the second bandwidth part.

Aspect 65: A method of wireless communication performed by a wireless communication device, the method comprising: transmitting, to a user equipment, a bandwidth part configuration that indicates one or more bandwidth parts associated with at least one beam; and switching, based at least in part on the bandwidth part configuration, from a first bandwidth part of the one or more bandwidth parts as an active bandwidth part to a second bandwidth part of the one or more bandwidth parts as the active bandwidth part.

Aspect 66: The method of Aspect 65, wherein the bandwidth part configuration is carried in at least one of: a radio resource control message, downlink control information, a medium access control control element, a system information block, or a combination thereof.

Aspect 67: The method of either of Aspects 65 or 66, wherein the wireless communication device comprises a non-terrestrial wireless communication device.

Aspect 68: The method of Aspect 67, wherein the non-terrestrial wireless communication device is a non-terrestrial base station or a non-terrestrial relay station.

Aspect 69: The method of any of Aspects 65-68, further comprising transmitting a broadcast message comprising an indication of one or more beam parameters associated with the at least one beam, the one or more beam parameters indicating at least one of: a Doppler frequency pre-compensation value associated with the at least one beam, a target location within a beam footprint associated with the at least one beam, a timing adjustment parameter associated with the at least one beam, or a combination thereof.

Aspect 70: The method of Aspect 69, wherein the target location comprises a center location of the beam footprint.

Aspect 71: The method of either of Aspects 69 or 70, wherein the timing adjustment parameter comprises an offset parameter corresponding to a delay component between the wireless communication device and the user equipment within the beam footprint.

Aspect 72: The method of any of Aspects 65-71, wherein the bandwidth part configuration indicates: a first initial uplink bandwidth part associated with a first beam, a first initial downlink bandwidth part associated with the first beam, a second initial uplink bandwidth part associated with a second beam, and a second initial downlink bandwidth part associated with the second beam.

Aspect 73: The method of any of Aspects 65-72, wherein the bandwidth part configuration indicates: a first default uplink bandwidth part associated with a first beam, a first default downlink bandwidth part associated with the first beam, a second default uplink bandwidth part associated with a second beam, and a second default downlink bandwidth part associated with the second beam.

Aspect 74: The method of any of Aspects 65-73, wherein the bandwidth part configuration does not include a configuration of at least one default bandwidth part associated with the at least one beam, and wherein at least one configured initial bandwidth part associated with the at least one beam comprises the at least one default bandwidth part.

Aspect 75: The method of any of Aspects 65-74, further comprising transmitting a beam switch time configuration that indicates a beam switch time associated with a switch, by the user equipment, from a first beam to a second beam as an active beam.

Aspect 76: The method of Aspect 75, further comprising: receiving an indication of a maximum beam switch time associated with the user equipment; and determining the beam switch time based at least in part on the maximum beam switch time.

Aspect 77: The method of either of Aspects 75 or 76, further comprising: receiving an indication of an antenna type associated with the user equipment; and determining the beam switch time based at least in part on the antenna type.

Aspect 78: The method of Aspect 77, wherein the antenna type comprises at least one of: a motor steered antenna type, an active electronically scanned array type, or a combination thereof.

Aspect 79: The method of any of Aspects 65-78, further comprising transmitting a pre-compensation switch time configuration that indicates a pre-compensation switch time associated with a switch, by the user equipment, from a first frequency pre-compensation to a second frequency pre-compensation as an active pre-compensation.

Aspect 80: The method of any of Aspects 65-79, further comprising switching from the first bandwidth part to the second bandwidth part by performing a bandwidth part switching procedure comprising: an inter-beam bandwidth part switching procedure, wherein the first bandwidth part is associated with a first beam of the at feast one beam and the second bandwidth part is associated with a second beam of the at least one beam, or an intra-beam bandwidth part switching procedure, wherein the first bandwidth part is associated with the first beam of the at least one beam and the second bandwidth part is associated with the first beam of the at least one, beam.

Aspect 81: The method of Aspect 80, wherein the bandwidth part configuration indicates: the inter-beam bandwidth part switching procedure, the first bandwidth part, an association between the first bandwidth part and the first beam, the second bandwidth part, an association between the second bandwidth part and the second beam, or a combination thereof.

Aspect 82: The method of Aspect 81, wherein the inter-beam bandwidth part switching procedure is configured using at least one of: a radio resource control message, a system information block, or a combination thereof.

Aspect 83: The method of either of Aspects 81 or 82, wherein the bandwidth part configuration indicates: the intra-beam bandwidth part switching procedure, the first bandwidth part, an association between the first bandwidth part and the first beam, the second bandwidth part, an association between the second bandwidth part and the first beam, or a combination thereof.

Aspect 84: The method of any of Aspects 80-83, wherein the intra-beam bandwidth part switching procedure is configured using a radio resource control message.

Aspect 85: The method of any of Aspects 65-84, wherein the bandwidth part configuration indicates a maximum number of bandwidth parts.

Aspect 86: The method of Aspect 85, wherein the maximum number of bandwidth parts is greater than four.

Aspect 87: The method of Aspect 86, wherein the maximum number of bandwidth parts comprises: a maximum number of intra-beam bandwidth parts, a maximum number of inter-beam bandwidth parts, or a combination thereof.

Aspect 88: The method of any of Aspects 65-87, wherein a bandwidth part of the one or more bandwidth parts is associated with a beam of the wireless communication device, wherein the wireless communication device is a serving wireless communication device, or a beam of an additional wireless communication device.

Aspect 89: The method of any of Aspects 65-88, wherein the bandwidth part configuration is carried in a radio resource control message that indicates the second bandwidth part as a target bandwidth part for switching.

Aspect 90: The method of Aspect 89, wherein the second bandwidth part comprises an active uplink bandwidth part or an active downlink bandwidth part.

Aspect 91: The method of Aspect 90, wherein the radio resource control message comprises a setup message or a reconfiguration message.

Aspect 92: The method of any of Aspects 65-91, wherein the bandwidth part configuration is carried in downlink control information that comprises a first set of indices associated with intra-beam bandwidth parts and a second set of indices associated with inter-beam bandwidth parts.

Aspect 93: The method of any of Aspects 65-92, wherein the bandwidth part configuration is carried in downlink control information comprising a bandwidth part identification field having a maximum number of bits that is greater than two.

Aspect 94: The method of any of Aspects 65-93, wherein the bandwidth part configuration is carried in downlink control information that indicates a bandwidth part type corresponding to the one or more bandwidth parts.

Aspect 95: The method of Aspect 94, wherein the downlink control information indicates a bandwidth part identifier corresponding to the second bandwidth part, wherein the bandwidth part type corresponds to the second bandwidth part, and wherein the method further comprises switching to the second bandwidth part based at least in part on the bandwidth part identifier and the bandwidth part type.

Aspect 96: The method of Aspect 95, wherein the downlink control information indicates the bandwidth part type using a bandwidth part type field having at least one bit.

Aspect 97: The method of any of Aspects 94-96, further comprising: applying a first scrambling sequence to a rate-matched channel encoder output, wherein the first scrambling sequence indicates a first bandwidth part type, or applying a second scrambling sequence to the rate-matched channel encoder output, wherein the second scrambling sequence indicates a second bandwidth part type.

Aspect 98: The method of Aspect 97, further comprising: scrambling a set of cyclic redundancy check bits using a first radio network temporary identifier having a first radio network temporary identifier sub-type to indicate a first bandwidth part type, or scrambling the set of cyclic redundancy check bits using a second radio network temporary identifier having a second radio network temporary identifier sub-type to indicate a second bandwidth part type.

Aspect 99: The method of Aspect 98, wherein the first radio network temporary identifier or the second radio network temporary identifier comprises: a cell radio network temporary identifier, a configured scheduling radio network temporary identifier, or a modulation and coding scheme cell radio network temporary identifier.

Aspect 100: The method of any of Aspects 94-99, further comprising: transmitting a first demodulation reference signal sequence that indicates a first bandwidth part type, or transmitting a second demodulation reference signal sequence that indicates a second bandwidth part type.

Aspect 101: The method of any of Aspects 65-100, wherein the bandwidth part configuration is carried in downlink control information, and wherein the method further comprises: generating an encoded communication comprising the downlink control information and a bandwidth part type indicator; and transmitting the encoded communication.

Aspect 102: The method of any of Aspects 65-101, wherein the bandwidth part configuration configures a bandwidth part identifier field to include a tuple having a unique tuple identifier that indicates a bandwidth part identifier corresponding to the second bandwidth part and a beam identifier corresponding to a target beam.

Aspect 103: The method of Aspect 102, wherein the beam identifier comprises at least one of: a cell identifier, a synchronization signal block index, a dedicated beam identifier, or a combination thereof.

Aspect 104: The method of either of Aspects 102 or 103, further comprising determining that the user equipment is likely to intercept the target beam, wherein the beam identifier indicates the target beam based at least in part on the determination that the user equipment is likely to intercept the beam.

Aspect 105: The method of Aspect 104, further comprising determining that the user equipment is likely to intercept the target beam based at least in part on a mobility state of the beam.

Aspect 106: The method of any of Aspects 102-105, wherein the bandwidth part configuration is carried in a radio resource control message, and wherein the method further comprises transmitting downlink control information comprising the bandwidth part identifier field including the tuple.

Aspect 107: The method of Aspect 106, wherein the bandwidth part identifier field comprises more than two bits.

Aspect 108: The method of any of Aspects 65-107, wherein the bandwidth part configuration indicates the one or more bandwidth pails by indicating one or more corresponding bandwidth part identifiers, and wherein the bandwidth part configuration is carried in: downlink control information based at least in part on the one or more bandwidth parts comprising one or more intra-beam bandwidth parts, or a medium access control control element based at least in part on the one or more bandwidth parts comprising one or more inter-beam bandwidth parts.

Aspect 109: The method of any of Aspects 65-108, wherein the bandwidth part configuration indicates the one or more bandwidth parts by indicating one or more corresponding bandwidth part identifiers, and wherein the bandwidth part configuration is carried in: downlink control information based at least in part on the one or more bandwidth parts comprising one or more intra-beam bandwidth parts, or a radio resource control message based at least in part on the one or more bandwidth parts comprising one or more inter-beam bandwidth parts.

Aspect 110: The method of any of Aspects 65-109, wherein the bandwidth part configuration indicates the one or more bandwidth parts by indicating one or more corresponding bandwidth part identifiers, and wherein the bandwidth part configuration is carried in: downlink control information based at least in part on the one or more bandwidth parts comprising one or more inter-beam bandwidth parts, a medium access control control element based at least in part on the one or more bandwidth parts comprising one or more intra-beam bandwidth parts, or a radio resource control message based at least in part on the one or more bandwidth parts comprising one or more intra-beam bandwidth parts.

Aspect 111: The method of any of Aspects 65-110, wherein the first bandwidth part is associated with a first beam and the second bandwidth part is associated with a second beam, and wherein the method further comprises transmitting downlink control information having a dedicated downlink control information format corresponding to inter-beam bandwidth part switching.

Aspect 112: The method of Aspect 111, wherein the dedicated downlink control information format comprises a set of resource elements that indicate at least one of: an inter-beam bandwidth part identifier, a wireless communication device identifier, a beam identifier, or a combination thereof.

Aspect 113: The method of Aspect 112, wherein the inter-beam bandwidth part identifier indicates at least one of: an initial uplink bandwidth part, an initial downlink bandwidth part, a default uplink bandwidth part, a default downlink bandwidth part, or a combination thereof.

Aspect 114: The method of either of Aspects 112 or 113, wherein the beam identifier comprises at least one of: a cell identifier, a synchronization signal block index, a dedicated beam identifier, or a combination thereof.

Aspect 115: The method of any of Aspects 112-114, further comprising transmitting an indication of the dedicated downlink control information format.

Aspect 116: The method of Aspect 115, wherein the indication comprises at least one of: a radio resource control configured search space, a cell radio network temporary-identifier used to address the user equipment and a format identifier field in the downlink control information, an inter-beam bandwidth part switching radio network temporary identifier used to address the user equipment, a specified scrambling sequence applied to a rate-matched channel encoder output, a specified demodulation reference signal sequence, a dedicated downlink control information format identifier that is encoded into an encoded message that includes the downlink control information, or a combination thereof.

Aspect 117: The method of any of Aspects 114-116, wherein further comprising receiving a feedback message that acknowledges receipt of the downlink control information.

Aspect 118: The method of any of Aspects 114-117, further comprising: transmitting a resource allocation comprising uplink resources; and receiving a scheduling request based at least in part on the uplink resources and the second bandwidth part.

Aspect 119: A method of wireless communication performed by a user equipment, the method comprising receiving, from a wireless communication device, a broadcast message comprising an indication of a Doppler frequency pre-compensation value associated with at least one beam; and communicating with the wireless communication device based at least in part on the Doppler frequency pre-compensation value.

Aspect 120: The method of Aspect 119, wherein the one or more beam parameters indicate a target location within a beam footprint associated with the at least one beam, wherein the target location comprises a center location of the beam footprint.

Aspect 121: A method of wireless communication performed by a wireless communication device, the method comprising transmitting, to a user equipment (UE), a broadcast message comprising an indication of a Doppler frequency pre-compensation value associated with at least one beam; and communicating with the UE based at least in part on the Doppler frequency pre-compensation value.

Aspect 122: The method of Aspect 121, wherein the one or more beam parameters indicate a target location within a beam footprint associated with the at least one beam, wherein the target location comprises a center location of the beam footprint.

Aspect 123: An apparatus for wireless communication at a device, comprising a processor; memory coupled with the processor; and instructions stored in the memory and executable by the processor to cause the apparatus to perform the method of one or more of Aspects 1-64.

Aspect 124: A device for wireless communication, comprising a memory and one or more processors coupled to the memory, the one or more processors configured to perform the method of one or more of Aspects 1-64.

Aspect 125: An apparatus for wireless communication, comprising at least one means for performing the method of one or more of Aspects 1-64.

Aspect 126: A non-transitory computer-readable medium storing code for wireless communication, the code comprising instructions executable by a processor to perform the method of one or more of Aspects 1-64.

Aspect 127: A non-transitory computer-readable medium storing a set of instructions for wireless communication, the set of instructions comprising one or more instructions that, when executed by one or more processors of a device, cause the device to perform the method of one or more of Aspects 1-64.

Aspect 128: An apparatus for wireless communication at a device, comprising a processor; memory coupled with the processor; and instructions stored in the memory and executable by the processor to cause the apparatus to perform the method of one or more of Aspects 65-118.

Aspect 129: A device for wireless communication, comprising a memory and one or more processors coupled to the memory, the one or more processors configured to perform the method of one or more of Aspects 65-118.

Aspect 130: An apparatus for wireless communication, comprising at least one means for performing the method of OM or more of Aspects 65-118.

Aspect 131: A non-transitory computer-readable medium storing code for wireless communication, the code comprising instructions executable by a processor to perform the method of one or more of Aspects 65-118.

Aspect 132: A non-transitory computer-readable medium storing a set of instructions for wireless communication, the set of instructions comprising one or more instructions that, when executed by one or more processors of a device, cause the device to perform the method of one or more of Aspects 65-118.

Aspect 133: An apparatus for wireless communication at a device, comprising a processor; memory coupled with the processor; and instructions stored in the memory and executable by the processor to cause the apparatus to perform the method of one or more of Aspects 119-120.

Aspect 134: A device for wireless communication, comprising a memory and one or more processors coupled to the memory, the one or more processors configured to perform the method of one or more of Aspects 119-120.

Aspect 135: An apparatus for wireless communication, comprising at least one means for performing the method of one or more of Aspects 119-120.

Aspect 136: A non-transitory computer-readable medium storing code for wireless communication, the code comprising instructions executable by a processor to perform the method of one or more of Aspects 119-120.

Aspect 137: A non-transitory computer-readable medium storing a set of instructions for wireless communication, the set of instructions comprising one or more instructions that, when executed by one or more processors of a device, cause the device to perform the method of one or more of Aspects 119-120.

Aspect 138: An apparatus for wireless communication at a device, comprising a processor; memory coupled with the processor; and instructions stored in the memory and executable by the processor to cause the apparatus to perform the method of one or more of Aspects 121-122.

Aspect 139: A device for wireless communication, comprising a memory and one or more processors coupled to the memory, the one or more processors configured to perform the method of one or more of Aspects 121-122.

Aspect 140: An apparatus for wireless communication, comprising at least one means for performing the method of one or more of Aspects 121-122.

Aspect 141: A non-transitory computer-readable medium storing code for wireless communication, the code comprising instructions executable by a processor to perform the method of one or more of Aspects 121-122.

Aspect :142: A non-transitory computer-readable medium storing a set of instructions for wireless communication, the set of instructions comprising one or more instructions that, when executed by one or more processors of a device, cause the device to perform the method of one or more of Aspects 121-122.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-h, a-c, h-c, and a-b-c, as well as any combination with multiples of the same element (e.g., a-a, a-a-a, a-a-h, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more" Furthermore, as used herein, the terms "set" and "group" are intended to include one or more items (e.g., related items, unrelated items, or a combination of related and unrelated items), and may be used. interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment, comprising:
   one or more memories; and
   one or more processors, coupled to the one or more memories, which are configured, individually or in any combination, to:
      receive a bandwidth part configuration that indicates multiple bandwidth parts associated with multiple beams and a type of beam switching associated with the multiple bandwidth parts, and an association between a first bandwidth part of the multiple bandwidth parts and a first beam of the multiple beams and an association between a second bandwidth part of the multiple bandwidth parts and a second beam of the multiple beams,
         wherein a number of bandwidth parts that the user equipment may switch to is greater than four, and
         wherein each bandwidth part, of the multiple bandwidth parts, is associated with a respective bandwidth part identifier;
      receive a beam switch time configuration that indicates a beam switch time associated with a switch, by the user equipment, from the first beam to the second beam as an active beam, wherein the beam switch time is determined based at least in part on an antenna type associated with the user equipment; and
      switch, based at least in part on the bandwidth part configuration and the beam switch time configuration, from the first bandwidth part as an active bandwidth part to the second bandwidth part as the active bandwidth part,
         wherein the type of beam switching indicates an intra-beam bandwidth part switch when the first beam and the second beam are a same beam, and
         wherein the type of beam switching indicates an inter-beam bandwidth part switch when the second beam is different from the first beam.

2. The apparatus of claim 1, wherein the bandwidth part configuration is carried in at least one of:
   a radio resource control message,
   downlink control information,
   a medium access control control element,
   a system information block, or
   a combination thereof.

3. The apparatus of claim 1, wherein the multiple beams are associated with a non-terrestrial wireless communication device.

4. The apparatus of claim 3, wherein the non-terrestrial wireless communication device is a non-terrestrial base station or a non-terrestrial relay station.

5. The apparatus of claim 1, wherein the one or more processors are further configured to:
   receive, from a wireless communication device associated with the multiple beams, a broadcast message comprising an indication of one or more beam parameters associated with the multiple beams, the one or more beam parameters indicating at least one of:
      a Doppler frequency pre-compensation value associated with the multiple beams,
      a target location within a beam footprint associated with the multiple beams,
      a timing adjustment parameter associated with the multiple beams, or
      a combination thereof.

6. The apparatus of claim 5, wherein the target location comprises a center location of the beam footprint.

7. The apparatus of claim 5, wherein the timing adjustment parameter comprises an offset parameter corresponding to a delay component between the wireless communication device and the user equipment within the beam footprint.

8. The apparatus of claim 1, wherein the bandwidth part configuration indicates:
   a first initial uplink bandwidth part associated with the first beam,
   a first initial downlink bandwidth part associated with the first beam,
   a second initial uplink bandwidth part associated with the second beam, and
   a second initial downlink bandwidth part associated with the second beam.

9. The apparatus of claim 1, wherein the bandwidth part configuration indicates:
   a first default uplink bandwidth part associated with the first beam,
   a first default downlink bandwidth part associated with the first beam,
   a second default uplink bandwidth part associated with the second beam, and
   a second default downlink bandwidth part associated with the second beam.

10. The apparatus of claim 1, wherein the bandwidth part configuration does not include a configuration of at least one default bandwidth part associated with the multiple beams, and
   wherein at least one configured initial bandwidth part associated with the multiple beams comprises the at least one default bandwidth part.

11. The apparatus of claim 1, wherein the one or more processors are further configured to:
   transmit an indication of a maximum beam switch time associated with the user equipment,
      wherein the beam switch time is based at least in part on the maximum beam switch time.

12. The apparatus of claim 1, wherein the one or more processors are further configured to:
transmit an indication of the antenna type associated with the user equipment.

13. The apparatus of claim 12, wherein the antenna type comprises at least one of:
a motor steered antenna type,
an active electronically scanned array type, or
a combination thereof.

14. The apparatus of claim 1, wherein the one or more processors are further configured to:
receive a pre-compensation switch time configuration that indicates a pre-compensation switch time associated with a switch, by the user equipment, from a first frequency pre-compensation to a second frequency pre-compensation as an active pre-compensation.

15. The apparatus of claim 1, wherein the one or more processors are further configured to:
switch from the first bandwidth part to the second bandwidth part by performing a bandwidth part switching procedure comprising:
an intra-beam bandwidth part switching procedure when the first beam and the second beam are the same beam, or
an inter-beam bandwidth part switching procedure when the first beam is different from the second beam.

16. The apparatus of claim 15, wherein the bandwidth part configuration further indicates the inter-beam bandwidth part switch.

17. The apparatus of claim 16, wherein the inter-beam bandwidth part switching procedure is configured using at least one of:
a radio resource control message,
a system information block, or
a combination thereof.

18. The apparatus of claim 15, wherein the bandwidth part configuration further indicates the intra-beam bandwidth part switch.

19. The apparatus of claim 18, wherein the intra-beam bandwidth part switching procedure is configured using a radio resource control message.

20. The apparatus of claim 1, wherein the bandwidth part configuration indicates a maximum number of bandwidth parts.

21. The apparatus of claim 20, wherein the maximum number of bandwidth parts is greater than five.

22. The apparatus of claim 20, wherein the maximum number of bandwidth parts comprises:
a maximum number of intra-beam bandwidth parts,
a maximum number of inter-beam bandwidth parts, or
a combination thereof.

23. The apparatus of claim 1, wherein a bandwidth part of the multiple bandwidth parts is associated with a beam of a serving wireless communication device or a beam of an additional wireless communication device.

24. The apparatus of claim 1, wherein the bandwidth part configuration is carried in a radio resource control message that indicates the second bandwidth part as a target bandwidth part for switching.

25. The apparatus of claim 24, wherein the second bandwidth part comprises an active uplink bandwidth part or an active downlink bandwidth part.

26. The apparatus of claim 24, wherein the radio resource control message comprises a setup message or a reconfiguration message.

27. The apparatus of claim 1, wherein the one or more processors are configured to:
switch from the first bandwidth part as an active bandwidth part to the second bandwidth part as the active bandwidth part, and from a serving beam to a target beam associated with the second bandwidth part, within a configured switch time delay based at least in part on the target beam being different than the serving beam.

28. The apparatus of claim 1, wherein the bandwidth part configuration is carried in downlink control information that comprises a first set of indices associated with intra-beam bandwidth parts and a second set of indices associated with inter-beam bandwidth parts.

29. The apparatus of claim 1, wherein the bandwidth part configuration is carried in downlink control information comprising a bandwidth part identification field having a maximum number of bits that is greater than two.

30. The apparatus of claim 1, wherein the type of beam switching comprises the inter-beam bandwidth part switch, and
wherein the one or more processors are configured to reset a default bandwidth part associated with the user equipment to correspond to a default bandwidth part associated with a target beam associated with the second bandwidth part.

31. The apparatus of claim 1, wherein the bandwidth part configuration is carried in downlink control information that indicates a bandwidth part type corresponding to the multiple bandwidth parts.

32. The apparatus of claim 31, wherein the downlink control information indicates a bandwidth part identifier corresponding to the second bandwidth part,
wherein the bandwidth part type corresponds to the second bandwidth part, and
wherein the one or more processors are configured to switch to the second bandwidth part based at least in part on the bandwidth part identifier and the bandwidth part type.

33. The apparatus of claim 31, wherein the downlink control information indicates the bandwidth part type using a bandwidth part type field having at least one bit.

34. The apparatus of claim 33, wherein the one or more processors are configured to:
directly decode a physical downlink control channel payload containing the downlink control information to extract the at least one bit.

35. The apparatus of claim 31, wherein the downlink control information indicates the bandwidth part type using:
a first scrambling sequence applied to a rate-matched channel encoder output, wherein the first scrambling sequence indicates a first bandwidth part type, or
a second scrambling sequence applied to the rate-matched channel encoder output, wherein the second scrambling sequence indicates a second bandwidth part type.

36. The apparatus of claim 35, wherein the one or more processors are configured to:
blindly decode a physical downlink control channel payload containing the downlink control information using the first scrambling sequence and the second scrambling sequence.

37. The apparatus of claim 31, wherein the downlink control information indicates the bandwidth part type using:
a first radio network temporary identifier sub-type of a radio network temporary identifier to indicate a first bandwidth part type, or a second radio network temporary identifier sub-type of a radio network temporary identifier to indicate a second bandwidth part type.

38. The apparatus of claim 37, wherein the radio network temporary identifier comprises:
   a cell radio network temporary identifier,
   a configured scheduling radio network temporary identifier, or
   a modulation and coding scheme cell radio network temporary identifier.

39. The apparatus of claim 37, wherein the one or more processors are configured to blindly decode a physical downlink control channel payload containing the downlink control information using the first radio network temporary identifier sub-type and the second radio network temporary identifier sub-type.

40. The apparatus of claim 31, wherein the downlink control information indicates the bandwidth part type using:
   a first demodulation reference signal sequence that indicates a first bandwidth part type, or
   a second demodulation reference signal sequence that indicates a second bandwidth part type.

41. The apparatus of claim 40, wherein the one or more processors are configured to determine the bandwidth part type by determining that:
   the first demodulation reference signal sequence is associated with a correct cyclic redundancy check, or
   the second demodulation reference signal sequence is associated with the correct cyclic redundancy check.

42. The apparatus of claim 1, wherein the bandwidth part configuration is carried in downlink control information, and wherein the one or more processors are further configured to:
   receive a bandwidth part type indicator, wherein the bandwidth part type indicator is carried in an encoded communication comprising the downlink control information.

43. The apparatus of claim 42, wherein the one or more processors are configured to:
   directly decode a physical downlink control channel payload containing the encoded communication to extract the bandwidth part type indicator.

44. The apparatus of claim 1, wherein the bandwidth part configuration configures a bandwidth part identifier field to include a tuple having a unique tuple identifier that indicates a bandwidth part identifier and a beam identifier.

45. The apparatus of claim 44, wherein the beam identifier comprises at least one of:
   a cell identifier,
   a synchronization signal block index,
   a dedicated beam identifier, or
   a combination thereof.

46. The apparatus of claim 44, wherein the beam identifier indicates a beam identified based at least in part on a determination that the user equipment is likely to intercept the beam.

47. The apparatus of claim 46, wherein the determination is made based at least in part on a mobility state of the beam.

48. The apparatus of claim 44, wherein the bandwidth part configuration is carried in a radio resource control message, and
   wherein the one or more processors are configured to:
      receive downlink control information comprising the bandwidth part identifier field including the tuple.

49. The apparatus of claim 48, wherein the bandwidth part identifier field comprises more than two bits.

50. The apparatus of claim 48, wherein the one or more processors are configured to:
   switch from the first bandwidth part to the second bandwidth part based at least in part on the tuple indicating the second bandwidth part.

51. The apparatus of claim 48, wherein the one or more processors are configured to:
   reset a default bandwidth part associated with the user equipment to correspond to a default bandwidth part associated with a target beam associated with the second bandwidth part.

52. The apparatus of claim 1,
   wherein the bandwidth part configuration is carried in:
      downlink control information based at least in part on the multiple bandwidth parts comprising multiple intra-beam bandwidth parts, or
      a medium access control control element based at least in part on the multiple bandwidth parts comprising multiple inter-beam bandwidth parts.

53. The apparatus of claim 1,
   wherein the bandwidth part configuration is carried in:
   downlink control information based at least in part on the multiple bandwidth parts comprising multiple intra-beam bandwidth parts, or
   a radio resource control message based at least in part on the multiple bandwidth parts comprising multiple inter-beam bandwidth parts.

54. The apparatus of claim 1,
   wherein the bandwidth part configuration is carried in:
      downlink control information based at least in part on the multiple bandwidth parts comprising multiple inter-beam bandwidth parts,
      a medium access control control element based at least in part on the multiple bandwidth parts comprising multiple intra-beam bandwidth parts, or
      a radio resource control message based at least in part on the multiple bandwidth parts comprising multiple intra-beam bandwidth parts.

55. The apparatus of claim 1, wherein the one or more processors are configured to:
   receive downlink control information having a dedicated downlink control information format corresponding to the inter-beam bandwidth part switch.

56. The apparatus of claim 55, wherein the one or more processors are configured to:
   switch from the first bandwidth part to the second bandwidth part based at least in part on the downlink control information.

57. The apparatus of claim 55, wherein the dedicated downlink control information format comprises a set of resource elements that indicate at least one of:
   an inter-beam bandwidth part identifier,
   a wireless communication device identifier,
   a beam identifier, or
   a combination thereof.

58. The apparatus of claim 57, wherein the inter-beam bandwidth part identifier indicates:
   an initial uplink bandwidth part,
   an initial downlink bandwidth part,
   a default uplink bandwidth part,
   a default downlink bandwidth part, or
   a combination thereof.

59. The apparatus of claim 57, wherein the beam identifier comprises at least one of:
   a cell identifier,
   a synchronization signal block index,
   a dedicated beam identifier, or
   a combination thereof.

60. The apparatus of claim 55, wherein the one or more processors are configured to:
receive an indication of the dedicated downlink control information format.

61. The apparatus of claim 60, wherein the indication comprises at least one of:
a radio resource control configured search space,
a cell radio network temporary identifier used to address the user equipment and a format identifier field in the downlink control information,
an inter-beam bandwidth part switching radio network temporary identifier used to address the user equipment,
a specified scrambling sequence applied to a rate-matched channel encoder output,
a specified demodulation reference signal sequence,
a dedicated downlink control information format identifier that is encoded into an encoded message that includes the downlink control information, or
a combination thereof.

62. The apparatus of claim 55, wherein the one or more processors are further configured to:
transmit a feedback message that acknowledges receipt of the downlink control information.

63. The apparatus of claim 62, wherein the one or more processors are further configured to:
receive a resource allocation comprising uplink resources; and
transmit a scheduling request, using the uplink resources and the second bandwidth part.

64. An apparatus for wireless communication at a wireless communication device, comprising:
one or more memories; and
one or more processors, coupled to the one or more memories, which are configured, individually or in any combination, to:
transmit, to a user equipment, a bandwidth part configuration that indicates multiple bandwidth parts associated with multiple beams, a type of beam switching associated with the multiple bandwidth parts, and an association between a first bandwidth part of the multiple bandwidth parts and a first beam of the multiple beams and an association between a second bandwidth part of the multiple bandwidth parts and a second beam of the multiple beams,
wherein a number of bandwidth parts that the user equipment may switch to is greater than four, and
wherein each bandwidth part, of the multiple bandwidth parts, is associated with a respective bandwidth part identifier;
transmit a beam switch time configuration that indicates a beam switch time associated with a switch, by the user equipment, from the first beam to the second beam as an active beam, wherein the beam switch time is determined based at least in part on an antenna type associated with the user equipment; and
switch, based at least in part on the bandwidth part configuration, from the first bandwidth part as an active bandwidth part to the second bandwidth part as the active bandwidth part,
wherein the type of beam switching indicates an intra-beam bandwidth part switch when the first beam and the second beam are a same beam, and
wherein the type of beam switching indicates an inter-beam bandwidth part switch when the second beam is different from the first beam.

65. A method of wireless communication performed by a user equipment, the method comprising:
receiving a bandwidth part configuration that indicates multiple bandwidth parts associated with multiple beams, a type of beam switching associated with the multiple bandwidth parts, and an association between a first bandwidth part of the multiple bandwidth parts and a first beam of the multiple beams and an association between a second bandwidth part of the multiple bandwidth parts and a second beam of the multiple beams,
wherein a number of bandwidth parts that the user equipment may switch to is greater than four, and
wherein each bandwidth part, of the multiple bandwidth parts, is associated with a respective bandwidth part identifier;
receiving a beam switch time configuration that indicates a beam switch time associated with a switch, by the user equipment, from the first beam to the second beam as an active beam, wherein the beam switch time is determined based at least in part on an antenna type associated with the user equipment; and
switching, based at least in part on the bandwidth part configuration, from the first bandwidth part as an active bandwidth part to the second bandwidth part as the active bandwidth part,
wherein the type of beam switching indicates an intra-beam bandwidth part switch when the first beam and the second beam are a same beam, and
wherein the type of beam switching indicates an inter-beam bandwidth part switch when the second beam is different from the first beam.

66. A method of wireless communication performed by a wireless communication device, the method comprising:
transmitting, to a user equipment, a bandwidth part configuration that indicates multiple bandwidth parts associated with multiple beams, a type of beam switching associated with the multiple bandwidth parts, and an association between a first bandwidth part of the multiple bandwidth parts and a first beam of the multiple beams and an association between a second bandwidth part of the multiple bandwidth parts and a second beam of the multiple beams,
wherein a number of bandwidth parts that the user equipment may switch to is greater than four, and
wherein each bandwidth part, of the multiple bandwidth parts, is associated with a respective bandwidth part identifier;
transmitting a beam switch time configuration that indicates a beam switch time associated with a switch, by the user equipment, from the first beam to the second beam as an active beam, wherein the beam switch time is determined based at least in part on an antenna type associated with the user equipment; and
switching, based at least in part on the bandwidth part configuration, from the first bandwidth part as an active bandwidth part to the second bandwidth part the active bandwidth part,
wherein the first bandwidth part is included in the first beam and the second bandwidth part is included in the second beam, and
wherein the second beam is different from the first beam.

67. An apparatus for wireless communication at a user equipment, comprising:

one or more memories; and
one or more processors, coupled to the one or more memories, which are configured, individually or in any combination, to:
receive, from a wireless communication device, a bandwidth part configuration that indicates an inter-beam bandwidth part switching procedure, an association between a first bandwidth part and a first beam, and an association between a second bandwidth part and a second beam that is different from the first beam, wherein a number of bandwidth parts that the user equipment may switch to is greater than four, and wherein the first bandwidth part is associated with a first bandwidth part identifier and the second bandwidth part is associated with a second bandwidth part identifier;
receive, from the wireless communication device, a broadcast message comprising an indication of a Doppler frequency pre-compensation value associated with at least one of the first beam or the second beam;
receive, from the wireless communication device, a beam switch time configuration that indicates a beam switch time associated with a switch, by the user equipment, from the first beam to the second beam as an active beam, wherein the beam switch time is determined based at least in part on an antenna type associated with the user equipment; and
communicate with the wireless communication device based at least in part on the Doppler frequency pre-compensation value and the beam switch time.

68. The apparatus of claim 67, wherein the broadcast message indicates one or more beam parameters, wherein the one or more beam parameters indicate a target location within a beam footprint associated with the at least one of the first beam or the second beam, and wherein the target location comprises a center location of the beam footprint.

69. The apparatus of claim 68, wherein the broadcast message indicates a timing adjustment parameter associated with the first beam and the second beam.

* * * * *